United States Patent
Maliszewski et al.

(10) Patent No.: US 9,131,741 B2
(45) Date of Patent: Sep. 15, 2015

(54) SYSTEM AND METHOD FOR THE DETECTION OF HELMET-TO-HELMET CONTACT

(71) Applicants: Gerald Maliszewski, San Diego, CA (US); Alan Sorgi, Poway, CA (US); George Bendak, San Diego, CA (US)

(72) Inventors: Gerald Maliszewski, San Diego, CA (US); Alan Sorgi, Poway, CA (US); George Bendak, San Diego, CA (US)

( * ) Notice: Subject to any disclaimer, the term of this patent is extended or adjusted under 35 U.S.C. 154(b) by 86 days.

(21) Appl. No.: 14/102,010

(22) Filed: Dec. 10, 2013

(65) Prior Publication Data

US 2014/0159922 A1   Jun. 12, 2014

Related U.S. Application Data

(60) Provisional application No. 61/736,400, filed on Dec. 12, 2012.

(51) Int. Cl.
  *G08B 21/00* (2006.01)
  *A42B 3/04* (2006.01)
  *H04Q 9/00* (2006.01)

(52) U.S. Cl.
  CPC . *A42B 3/046* (2013.01); *H04Q 9/00* (2013.01)

(58) Field of Classification Search
  CPC .... A42B 3/046; A63B 2220/40; A63B 71/10; A63B 2220/53; A63B 2243/007; A63B 71/06; A63B 2225/50; A61B 5/6803; A61B 5/6814; A61B 2562/0219; H04Q 2209/845
  USPC ......... 340/870.16, 870.01, 573.1, 665; 2/411, 2/425
  See application file for complete search history.

(56) References Cited

U.S. PATENT DOCUMENTS

| | | | | |
|---|---|---|---|---|
| 5,390,367 | A * | 2/1995 | Rush, III | 2/462 |
| 5,539,935 | A * | 7/1996 | Rush, III | 2/422 |
| 5,914,661 | A * | 6/1999 | Gross | 340/600 |
| 6,364,073 | B1 * | 4/2002 | Fierro et al. | 188/181 R |
| 6,798,392 | B2 * | 9/2004 | Hartwell et al. | 345/8 |
| 6,826,509 | B2 * | 11/2004 | Crisco et al. | 702/141 |
| 7,162,392 | B2 * | 1/2007 | Vock et al. | 702/182 |
| 7,509,835 | B2 * | 3/2009 | Beck | 73/12.01 |
| 8,289,185 | B2 * | 10/2012 | Alonso | 340/870.11 |
| 8,477,046 | B2 * | 7/2013 | Alonso | 340/870.11 |
| 8,554,509 | B2 * | 10/2013 | Crisco et al. | 702/141 |
| 8,556,831 | B1 * | 10/2013 | Faber et al. | 600/587 |

(Continued)

FOREIGN PATENT DOCUMENTS

EP    2133700    12/2008

*Primary Examiner* — Ariel Balaoing
*Assistant Examiner* — Kam Ma
(74) *Attorney, Agent, or Firm* — Law Office of Gerald Maliszewski; Gerald Maliszewski

(57) ABSTRACT

System and methods are provided for detecting helmet contact. A first helmet (e.g., an offensive player's helmet) detects an impact, and transmits a signal indicating the detected impact. A second helmet (e.g., a defensive player's helmet) detects the impact and transmits a signal indicating a detected impact. In response to analyzing the signal transmissions of first and second helmets, a monitor determines that a helmet-to-helmet contact has occurred between the first and second helmets. To minimize the occurrence of false positive determinations, especially in the event that multiple helmets detect impacts, the helmets may be enabled to only transmit a signal if the impact exceeds a first impact threshold. Another means of minimizing false positives is for the helmets to transmit a timestamp associated with a time of impact occurrence. Further, helmets may collect and transmit information regarding the proximity of other helmets.

17 Claims, 28 Drawing Sheets

(56) References Cited

U.S. PATENT DOCUMENTS

| | | | |
|---|---|---|---|
| 8,797,165 B2* | 8/2014 | Greenwald et al. | 340/573.1 |
| 2002/0024450 A1* | 2/2002 | Townsend et al. | 340/870.16 |
| 2005/0212472 A1* | 9/2005 | Chapman et al. | 318/439 |
| 2005/0266967 A1* | 12/2005 | Considine et al. | 482/84 |
| 2006/0038694 A1* | 2/2006 | Naunheim et al. | 340/665 |
| 2007/0056081 A1* | 3/2007 | Aspray | 2/411 |
| 2008/0256685 A1* | 10/2008 | Lampe et al. | 2/411 |
| 2008/0256687 A1* | 10/2008 | Spencer | 2/425 |
| 2009/0307827 A1* | 12/2009 | Aspray | 2/425 |
| 2011/0181418 A1* | 7/2011 | Mack et al. | 340/573.1 |
| 2011/0181420 A1* | 7/2011 | Mack et al. | 340/573.1 |
| 2011/0205081 A1* | 8/2011 | Chen et al. | 340/870.01 |
| 2011/0251802 A1* | 10/2011 | Song | 702/41 |
| 2012/0075095 A1* | 3/2012 | Howard et al. | 340/539.12 |
| 2012/0077440 A1* | 3/2012 | Howard et al. | 455/41.2 |
| 2012/0092178 A1* | 4/2012 | Callsen et al. | 340/669 |
| 2012/0105224 A1* | 5/2012 | Ford | 340/539.12 |
| 2012/0124720 A1* | 5/2012 | Evans et al. | 2/424 |
| 2012/0150453 A1* | 6/2012 | Benzel et al. | 702/41 |
| 2012/0210498 A1* | 8/2012 | Mack | 2/414 |
| 2012/0220893 A1* | 8/2012 | Benzel et al. | 600/553 |
| 2013/0074248 A1* | 3/2013 | Evans et al. | 2/421 |
| 2014/0159922 A1* | 6/2014 | Maliszewski et al. | 340/870.16 |
| 2014/0343701 A1* | 11/2014 | Song et al. | 700/92 |

* cited by examiner

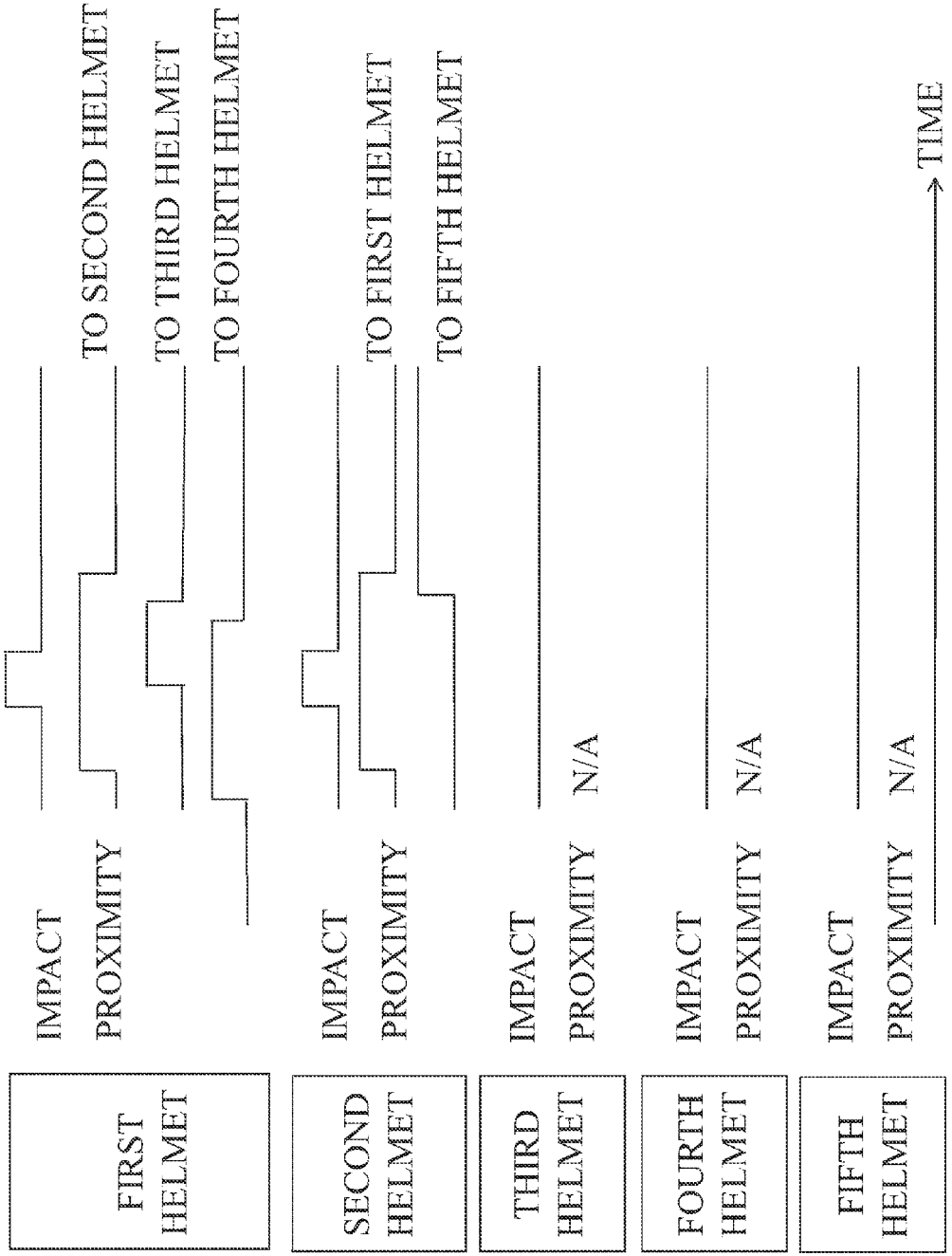

SYSTEM AND METHOD FOR THE DETECTION OF HELMET-TO-HELMET CONTACT

RELATED APPLICATIONS

This application claims priority to a Provisional application entitled, SYSTEM AND METHOD FOR THE DETECTION OF HELMET-TO-HELMET CONTACT, invented by Maliszewski et al., Ser. No. 61/736,400, filed on Dec. 12, 2012, which is incorporated herein by reference.

BACKGROUND OF THE INVENTION

1. Field of the Invention

This invention generally relates to sporting equipment and, more particularly, to a helmet and system capable of detecting helmet-to-helmet collisions.

2. Description of the Related Art

One of the more recent additions to the list of penalties in the game of professional football is the so-called helmet-to-helmet contact rule. Generally, the rule forbids a player, typically a defensive player, from using their helmet to tackle or otherwise strike the helmet of an opposing player. This action is considered to be more egregious if the opposing player is the quarterback, or if the player being struck is a receiver in a temporarily defenseless position while in the act of catching a thrown ball. The policy behind the rule is to prevent injury to players, especially concussions.

This violation is particularly difficult to detect since there can be very little difference between a legal contact and an illegal contact. Inevitably, in the course of a game, a helmet-to-helmet contact penalty becomes the source of controversy, as instant replay shows that a referee failed to call a penalty after a helmet-to-helmet collision, or the referee incorrectly called such a penalty for a legal hit. Since the violation comes with a stiff penalty, an incorrect call may possibly have a dramatic effect on the outcome of the game.

Methods already exist for transmitting impact data to a central computer, which permit personnel on the sideline to determine if a serious impact has occurred. For example, see US 2001/0181418. However, to date, there is no system that is able to detect if a helmet is impacting another helmet. More particularly, no system exists that is able to determine exactly which helmet is impacting with another helmet.

It would be advantageous if helmet-to-helmet collisions could be more easily detected by a referee.

It would be advantageous if means existed for automatically detecting a helmet-to-helmet collision in real-time.

It would also be advantageous to automatically identify exactly which helmets are involved in helmet-to-helmet collisions.

SUMMARY OF THE INVENTION

Accordingly, a method is provided for detecting helmet contact. The method includes a number of related variations and options, but generally operates as follows. A first helmet (e.g., an offensive player's helmet) detects an impact, and transmits a signal indicating the detected impact. A second helmet (e.g., a defensive player's helmet) detects the impact and transmits a signal indicating a detected impact. In response to analyzing the signal transmissions of first and second helmets, a monitor (e.g., a processing device on the sidelines) determines that a helmet-to-helmet contact has occurred between the first and second helmets. To minimize the occurrence of false positive determinations, especially in the event that multiple helmets each detect an impact, the helmets may be enabled to only transmit a signal if the impact exceeds a first impact threshold. Another means of minimizing false positives is for the helmets to transmit a timestamp associated with a time of impact occurrence. Thus, two helmets having the same timestamp have a greater likelihood of having collided with each other.

In another aspect, the first helmet additionally detects the proximity of a second helmet, and the second helmet detects the proximity of the first helmet. In addition to transmitting signals indicating the detected impact, the first and second helmets transmit a signal indicating detected helmet proximity. The monitor is able to more accurately make a determination of a helmet-to-helmet collision by analyzing the detected impact information in combination with the detected proximity information. That is, two helmets both reporting an impact and proximity to each other, have a high likelihood of having collided with each other. The occurrence of false positives can be further minimized if the helmets only transmit the detected proximity of another helmet, if the helmet identity signal used to determine proximity exceeds a minimum signal strength.

In one aspect, the first helmet detects an impact and detects the proximity of a second helmet, as above. To minimize the number of signals being transmitted the first helmet only transmits the second helmet proximity detection results in response to detecting impacts. Alternatively stated, the first helmet does not transmit a separate signal indicating that an impact has occurred, but only the detection of a proximately located helmet. However, the proximity detection results are only transmitted if an impact has occurred. Optionally, the first helmet may record the impact and/or proximity results, so that they may be recovered after a play or after the game. In another aspect, the first helmet collects global positioning satellite (GPS) position information instead of detecting helmet proximity. The first helmet transmits a signal indicating the detected impact and the collected GPS position information. A monitor analyzes detected impacts and GPS position information from a plurality of helmets to determine if a helmet-to-helmet contact has occurred. In another aspect, helmet position can be tracked using a position triangulation method.

Additional details of the above-described methods, as well as a helmet and system to enable the methods, are provided below.

BRIEF DESCRIPTION OF THE DRAWINGS

FIGS. 1A through 1D are diagrams depicting a system for detecting helmet-to-helmet contact.

DETAILED DESCRIPTION

Figure 1A:
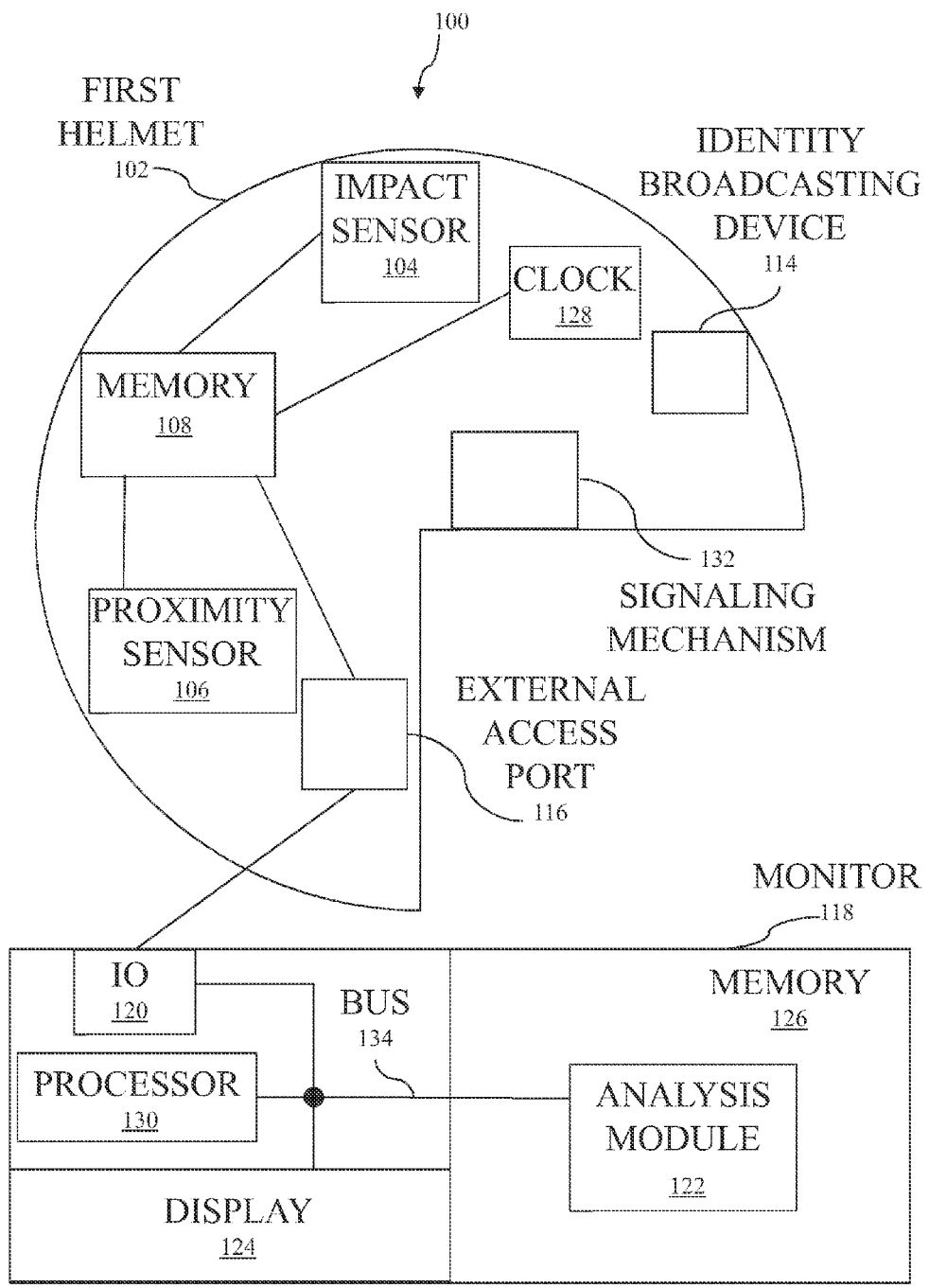

FIGS. 1A through 1D are diagrams depicting a system for detecting helmet-to-helmet contact. As shown in FIG. 1A, the system 100 comprises a first helmet 102, and an impact sensor 104 embedded in the first helmet to detect a helmet impact. A proximity sensor 106 is also embedded in the first helmet 102 to detect the proximity of another helmet. As used herein, the term "embedded in" should be understood to mean that the sensors may be inside the helmet between the inside and outside surfaces, attached to an inside surface of the helmet, or an edge of the helmet. A non-transitory memory device 108 is embedded in the first helmet, and connected to the impact sensor 104 and proximity sensor 106, to record impact detection results and proximity detection results. Alternatively, some of the components mentioned herein may be attached to padding or clothing worn by a player, and connected to helmet-embedded components via a hardwired or wireless connection. In one aspect, the memory device 108 records the detection of an impact exceeding a first impact threshold. The memory device 108 may also record detected impact magnitude measurements. The impact threshold and impact magnitude measurements may be used as additional data points to determine if the recorded impact was actually an impact with another helmet. This information may also be used to determine the possibility of a player sustaining an injury, such as a concussion, as a result of an impact. Thus, in some aspects a helmet may only comprise an impact sensor and a memory device to record impact data. Optionally, the impact sensor 104, or a plurality of impact sensors working in cooperation are able to detect an impact to a particular portion of the first helmet 102, for example, the crown of the helmet. In this manner it may be possible to detect if the player wearing the first helmet 102 uses the crown of the helmet to impact or "spear" another player.

In another aspect, the memory device 108 records the detection of a proximity signal exceeding a received first signal strength. In this aspect, the impacting helmet emits some kind of signal that permits it to be uniquely identified and distinguished from other helmets.

There are a number of means that may be used to detect impact. The impact sensor may, for example, be an accelerometer that detects sudden changes in helmet motion. Alternatively, the impact sensor may be a device that detects a deformation in the shape of the helmet, the absorption of energy, or an increase in temperature in a particular portion of the helmet. The sensor may include a set of conductive lines spread inside the helmet or across the inside helmet surface, to measure a change in electrical resistance as a result of an impact. The impact sensor may be a single sensor, a plurality of independent sensors, or a plurality of sensors working in cooperation.

Optionally, as shown, the first helmet 102 may further comprise a clock 128 having an output to supply timestamps, permitting the memory device 108 to record a timestamp associated with a time of impact occurrence, with a time of proximity detection, or with both. Here, the clock 128 is shown connected to the memory 108, but alternatively, the clock may be connected to the impact detector, proximity detector, or all the helmet modules. In one aspect, the proximity sensor 106 simultaneously detects a plurality of helmet proximity signals, and the memory device 108 records the detection of the plurality of helmet proximity signals, or alternatively, just the detection of a helmet proximity signal having the largest detected signal strength. In this case, the term "simultaneously" is intended to identify a duration of time less than or equal to the occurrence of a play. Alternatively, the term is intended to identify detected proximity at the time of detected impact, within a margin or window of time. For example, the margin may be about 0.5 milliseconds. Note: the use of timestamps may require a precision calibration process, performed either before, during, or after a game, in order to synchronize helmet clock timing to a common temporal reference.

The first helmet 102 may further comprise, as shown, an identity broadcasting device 114, to be used for first helmet proximity detection. The identity broadcasting device may be enabled continuously or after the impact sensor 104 detects an impact. In a system of helmets using the latter type of broadcast trigger, the first helmet is only able to identify the proximity of another helmet, if that other helmet is impacted. Although termed a "broadcaster", the identity broadcaster may in some variations, broadcast (i.e. respond with) an identity signal in response to interrogation by a proximity sensor. The interrogations by the proximity sensor or broadcasts by the identity broadcaster may be continuous, periodic, random, or triggered as the result of an impact.

In one simple version of system 100, offensive player helmets may be equipped as shown in FIG. 1A with at least an impact sensor 104 and proximity sensor, while defensive player helmets are equipped with at least an identity broadcasting device 114. In this version, only the offensive player helmets are used to detect helmet-to-helmet collisions based upon the detection of an impact and the detection of a proximate defensive player helmet.

A variety of means can be used to emit identity signals for proximity detection. In one aspect, a Bluetooth Piconet or Piconets might be established between helmets, or between helmets and a monitor device located on the sidelines. In another aspect, the helmets may be connected in a personal area network (PAN). Alternatively, the system may be a proprietary wireless network with each helmet broadcasting a unique signal that permits each helmet to be uniquely identified. In another aspect, the helmets may be essentially passive, each having a unique electromagnetic signature that permits identification. For example, helmets may be equipped with a radio frequency identification (RFID) tag.

As noted in Wikipedia, RFID is a wireless non-contact system that uses radio-frequency electromagnetic fields to transfer data from a tag attached to an object (e.g., a helmet), for the purposes of automatic identification. Some tags require no battery and are powered by the electromagnetic fields used to read them. For example, a helmet may use a local power source (battery) and the proximity sensor emits radio waves. The tag contains electronically stored information that can be read from up to several yards away. The tag's information is stored electronically in a non-volatile memory. The RFID tag, in this case functioning as the identity broadcaster, includes a small RF transmitter and receiver. An RFID reader (e.g., in a first helmet) transmits an encoded radio signal to interrogate the tag (e.g., in a second helmet). The tag receives the message and responds with its identification information. This may be only a unique tag serial number. To prevent RF transmission collisions between tags, a slotted Aloha system may be used, with the reader broadcasting an initialization command and a parameter that the tags individually use to pseudo-randomly delay their responses. Other means of near field communications are known in the art that may be used to enable proximity detection. Alternatively, an RFID reader proximity sensor might only interrogate in response to a detected impact. As another alternative, communications between the proximity sensor and identity broadcaster may be based upon near-field communications (NFC).

Figure 1B:
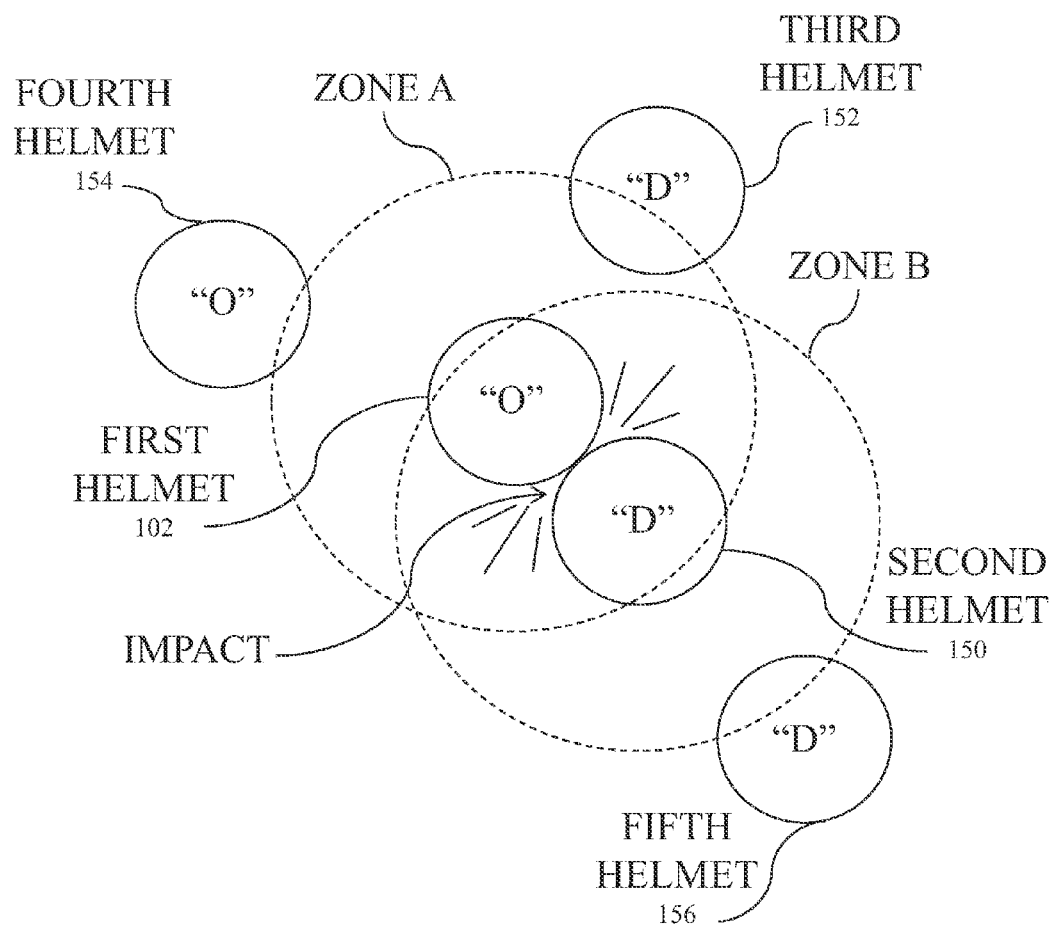

As shown in FIG. 1B, first helmet 102 impacts with a second helmet 150. Both the first helmet 102 and second helmet 150 record an impact. The helmets worn by offensive position players are marked with a "O", and the helmets worn by defensive position players are marked with a "D". Also shown, with dotted lines, is zone A, which is the area in inside which the first helmet 102 can detect other helmets. As shown, second helmet 150, third helmet 152, and fourth helmet 154 are shown at least partially in zone A. In other words, the first helmet 102 is able to detect helmets 150, 152, and 154 at the time of impact. In one aspect, the proximity sensor in the first helmet operates at a different frequency, or is otherwise able to ignore or filter the identity broadcasting devices in other offensive player helmets, as a means of simplifying the tasks of sensing, recording, and analyzing. In this scenario, the first helmet 102 might recognize that an impact occurred with helmets 150, 152, or 154. If proximity sensor/identity broadcast filtering is used, helmet 154 is eliminated from consideration as a possible impact source. In post-event analysis, proximity signal strength measurements may be used eliminate helmet 152 from consideration as an impact source, as would an analysis of the impact data from helmet 152.

Likewise, zone B is the area inside which the second helmet 150 can detect proximate helmets. As shown, the second helmet is able to detect the first helmet 102 and fifth helmet 156. As with the first helmet 102, the second helmet proximity detector may be tuned to only recognize helmets from the opposing team.

Returning to FIG. 1A, the memory device 108 typically has an external access port 116 to supply recorded impact detection results and proximity detection results. The access port 116 may be enabled using a wired cable connector, wireless, or NFC interface. ISO/IEC 18092 is one example of an NFC standard. Alternatively, the memory 108 may reside in a module (not shown) that is selectively engaged and disengaged from the helmet 102. In one aspect, the memory 108 can be quickly disengaged in-situ, between plays. After reading or analysis, the memory can be re-engaged or a new memory engaged with the helmet. Other components of the system 100 may also reside within the module so that they can be conveniently tested, repaired, or replaced.

The system may further comprise a monitor 118. The monitor 118 may be a handheld device or it may be a stationary device located on the sidelines or in a testing facility. The monitor 118 has an interface or input/output (IO) 120 for reading the impact detection results and proximity detection results supplied from a helmet external access port 116. The IO 120 may be a wired connector interface or one of the wireless interfaces mentioned above with reference to the helmet external access port 116. The monitor 118 also has an analysis module 122 to determine that a helmet-to-helmet contact has occurred in response analyzing the impact detection results and proximity detection results from a plurality of helmet memory devices. The monitor 118 also has an interface (e.g., a display) 124 to supply analysis results. If carried as a handheld device, the monitor may supply an auditory signal, so that the official carrying device is warned to check analysis results on the display. If the monitor is mounted on the sidelines, analysis data can be supplied to an official on the field via a wireless device, in the form of automatically generated signals. Alternatively, a sidelines official may communicate with an official on the field. In another aspect, the analysis results can be displayed electronically on a sideline marker, similar to the marker used to indicate the down.

In one aspect, the helmets may be enabled with a signaling mechanism 132. Upon the event of a significant impact, the signaling mechanism may alert users that the helmet memory should be immediately accessed for the purpose of penalty analysis or an evaluation of player safety. The signaling mechanism 132 may be a visual or audio alarm. As explained in more detail below, a wireless transmitter can be added to the system, so as to enable a signaling mechanism.

In one aspect, the analysis module 122 is enabled as a software application using a sequence of software instructions stored in a non-transitory memory 126 and executed by a processor 130 that is connected via bus 134. Alternatively, the analysis module 122 is enabled with state machine logic using a field programmable gate array (FPGA) for example (not shown).

FIG. 1D depicts an exemplary analysis that might be performed by the analysis module. Both the first and second helmets register an impact at approximately the same time. The first helmet records the proximity of the second, third, and fourth helmets at the time of impact. The second helmet records the proximity of the first and fifth helmets at the time of impact. The third, fourth, and fifth helmets register no impact. The third, fourth, and fifth helmets may record proximity data at the time of impact, but it is not shown in this figure (marked as N/A).

Figure 1C:
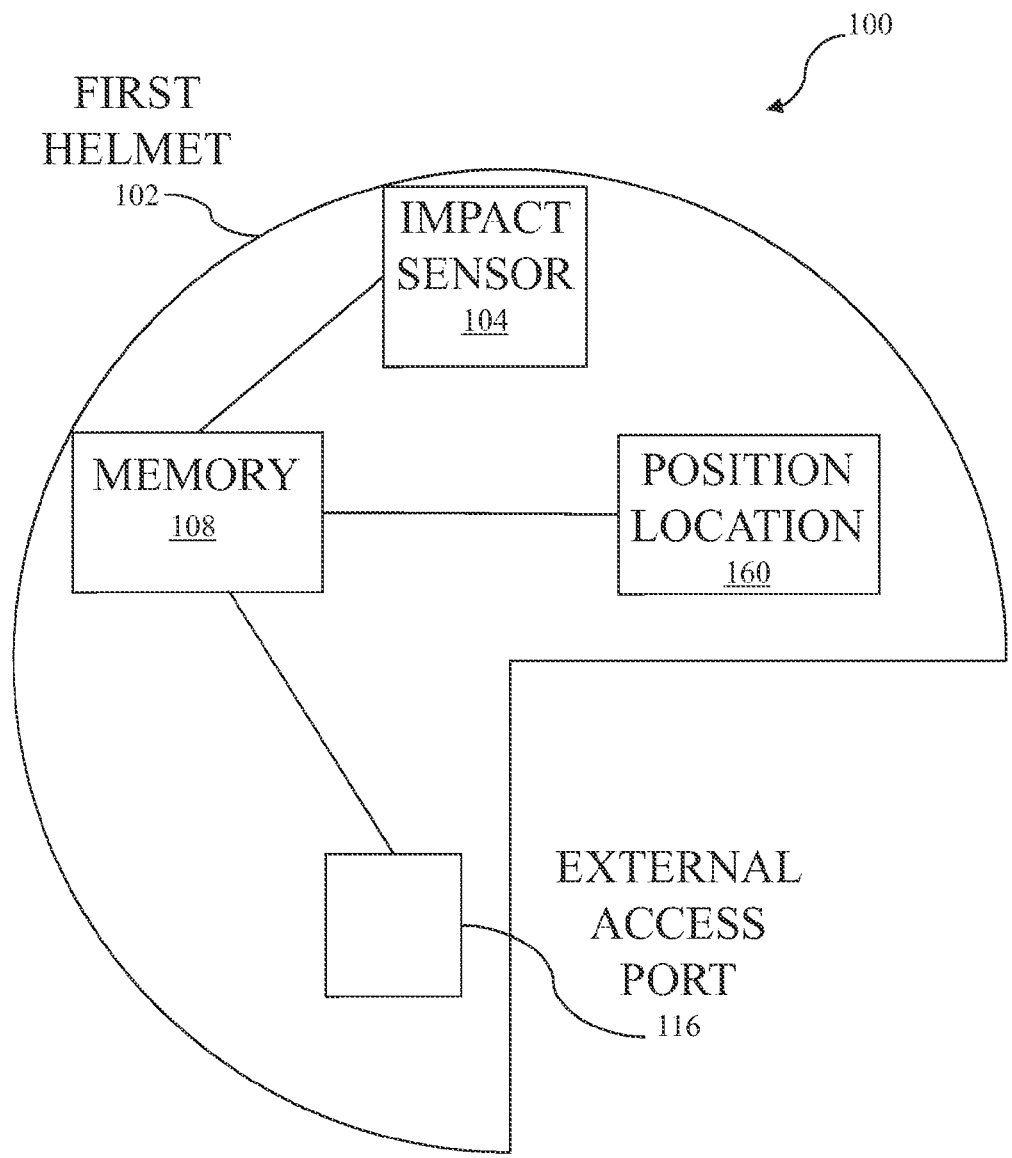

In another aspect as shown in FIG. 1C, the first helmet 102 includes a position location device 160, and the memory device 102 records position information as well as detected impacts. Note: the proximity sensor and identity broadcasting device may not be needed if the helmet includes a position location device. The position location device may be a global positioning satellite (UPS) receiver (see the system of FIG. 7) or a device that relies upon position triangulation (see the systems of FIGS. 15 and 16).

Figure 2:
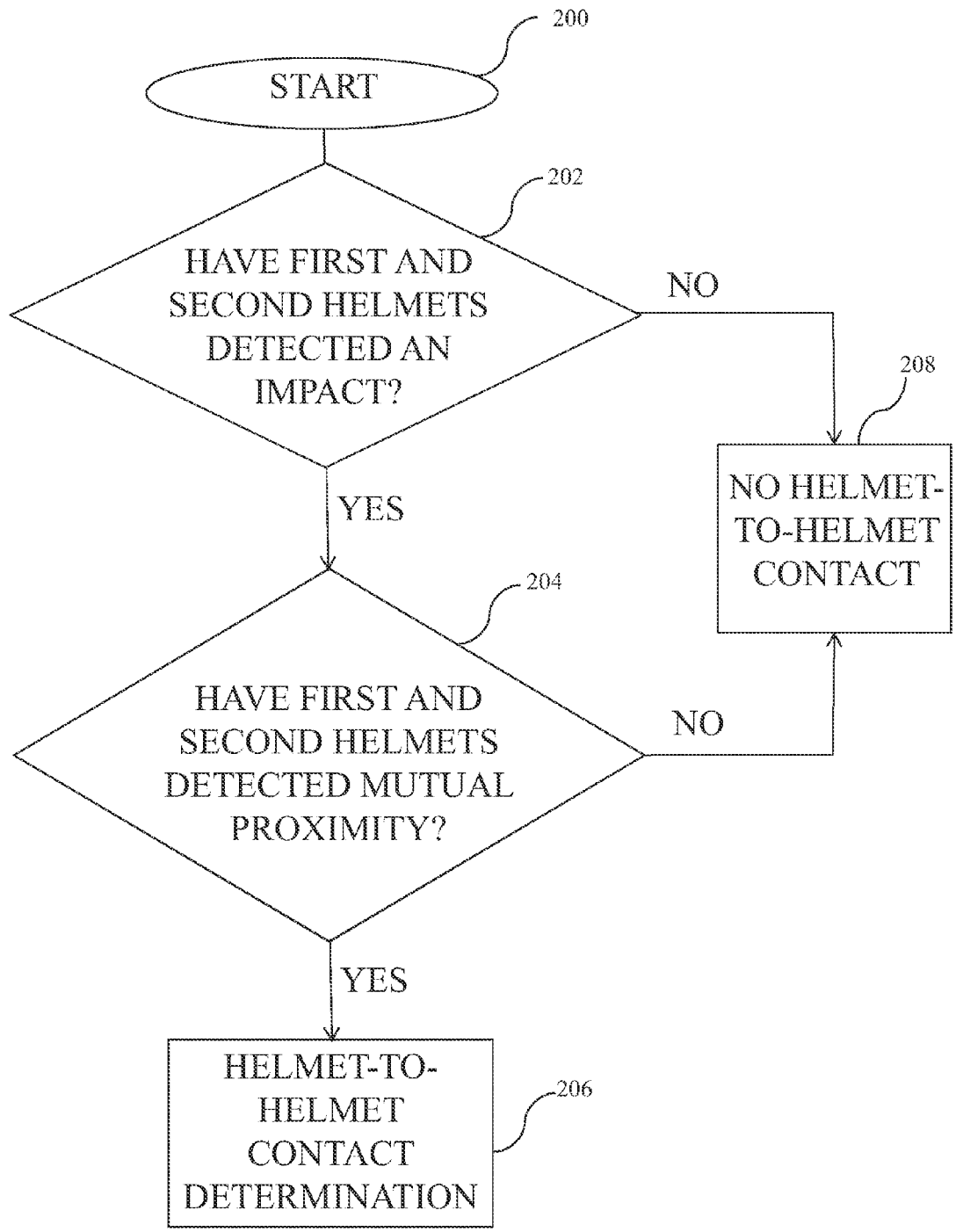
FIG. 2 is flowchart depicting an exemplary process for determining the occurrence of a helmet-to-helmet collision.

FIG. 2 is flowchart depicting an exemplary process for determining the occurrence of a helmet-to-helmet collision. It should be understood that the analysis module may be required to examine data from many helmets, depending upon whether the data is collected on a play-by-play basis, or after a game. However, in the interest of clarity, only the data from two helmets is considered. The flowchart begins at Step 200.

Step 202 considers whether the first helmet and second helmets have detected an impact. If so, Steps 204 considers whether the first and second helmets have detected mutual proximity. If so, Step 206 determines that a helmet-to-helmet collision has occurred. Although more complicated when multiple helmets are considered, it can be seen that the relatively simple logic process may be enabled with combinational logic circuitry, and the results are relatively easy to display. If the determinations made in Steps 202 or 204 are negative, then Step 208 determines that no helmet-to-helmet contact occurred between the first and second helmets. In one aspect, only the first helmet is used to detect an impact in Step 202 and only the first helmet is used to detect proximity in Step 204.

Figure 3:
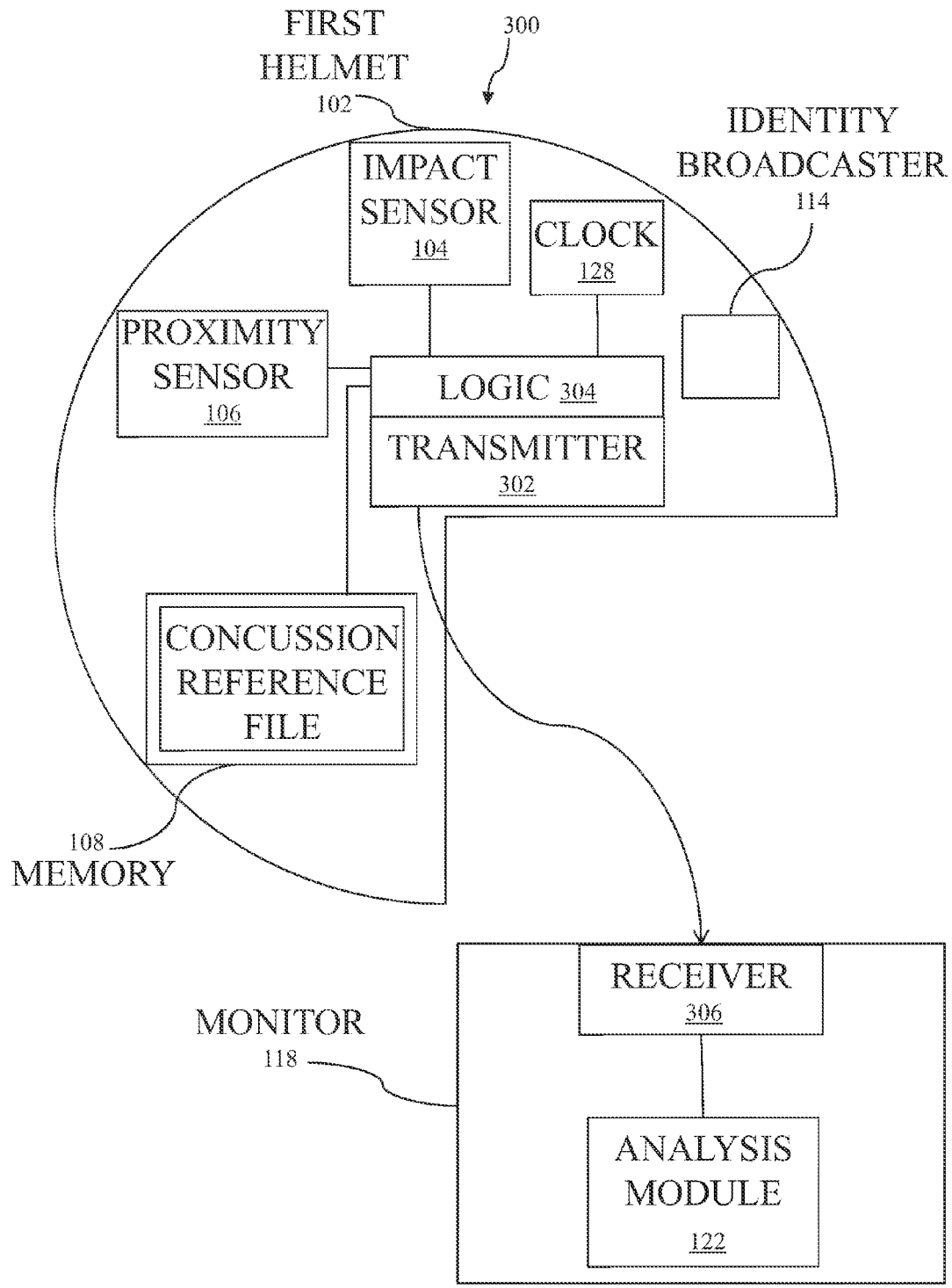
FIG. 3 is a schematic block diagram depicting a first variation of the system for detecting helmet-to-helmet contact.

FIG. 3 is a schematic block diagram depicting a first variation of the system for detecting helmet-to-helmet contact. The system 300 comprises a first helmet 102, and an impact sensor 104 embedded in the first helmet to detect a helmet impact. A proximity sensor 106 is embedded in the first helmet 102 to detect the proximity of another helmet. A transmitter 302 is embedded in the first helmet 102, and is connected to the proximity sensor 106 to transmit proximity detection results in response to the impact sensor 104 detecting the helmet impact. While the system of FIGS. 1A, 1B, 1C, and 2 is useful for post-event analysis, the addition of a transmitter to the helmet promotes analysis in real-time.

The impact sensor and proximity sensor may be enabled as explained above in the description of FIG. 1A. The transmitter 302 may be a Bluetooth, PAN, or proprietary RF system transmitter. In another aspect, the transmitter is a cellular telephone transmitter. The operations performed by the first helmet may follow one of several different scenarios. The impact sensor may enable the proximity sensor in response to detecting an impact. Alternatively, the transmitter may receive both impact and proximity detection results, and an internal logic unit 304, as shown, may command the transmitter to transmit proximity detection results in response to determining that an impact has occurred. In another aspect not shown, the logic unit 304 may be embedded with the impact sensor, with the proximity sensor, or be an independent module. The logic unit 304 may be enabled using relatively simple combinational logic circuitry, FPGA, or processor executable software instructions (see the system of FIG. 18).

The first helmet transmitter 302 may transmit the proximity detection results in response to the impact exceeding a first impact threshold. In another aspect, the proximity sensor 106 detects a second helmet identity signal, and the transmitter 302 transmits the proximity detection results in response to the second helmet identity signal exceeding a first signal strength.

In one aspect, a clock 128 is embedded in the first helmet 102 to supply a timestamp. Such an arrangement permits the transmitter 302 to transmit the proximity detection results with a timestamp associated with a time of impact occurrence. The clock is shown connected to the internal logic module 304, but may alternatively be connected to other modules and devices in the helmet. If the impact sensor 104 measures impact magnitude, the transmitter 302 may also transmit impact magnitude measurements. The timestamp and impact magnitude data may be used to fine tune the analysis of whether the impact is a helmet-to-helmet type of impact. The use of such a helmet system, even without the proximity sensors, may be of use in monitoring for the occurrence of potential concussions.

In another aspect, the proximity sensor 106 may detect the proximity of a plurality of helmets with corresponding identity signals. Then, the transmitter may transmit the proximity detection results for a helmet having the largest measured identity signal strength, or for the plurality of helmets.

For the purpose of supplying proximity information to surrounding helmets, a helmet identity broadcaster 114 is embedded in the first helmet 102. The helmet identity broadcaster 114 may be enabled continuously, periodically, or in response to the impact sensor 104 detecting an impact. Alternatively, the identity broadcaster may be interrogated continuously or periodically.

In another aspect, the helmet 102 comprises a memory 108 that may record impact and proximity data. The memory 108 may further include a concussion reference file. For example, the concussion reference file may represent a graph of impact magnitude over a duration of time, or just a maximum magnitude value. In one aspect, each helmet is individually calibrated against a known impact force to generate a unique concussion reference file for each helmet. The logic 304 may compare any detected impacts to the concussion reference file. The matching of actual impact data to the concussion reference file may trigger event such as the broadcasting of identity, the collection of proximity data, transmission of impact and/or proximity data, or the transmission of a recorded impact file. Although not explicitly shown, a concussion reference file may be included in the memory of the system (100) of FIG. 1A.

The system 300 further comprises a monitor 118 with a receiver 306 for accepting impact and proximity detection results transmitted by the plurality of helmets. An analysis module 122 determines if a helmet-to-helmet contact has occurred in response to analyzing the impact and proximity detection results from the plurality of helmets. An interface 124 supplies the analysis results. The monitor may be enabled using a state machine, combinational logic, or a software application executed by a processor.

Figure 4:
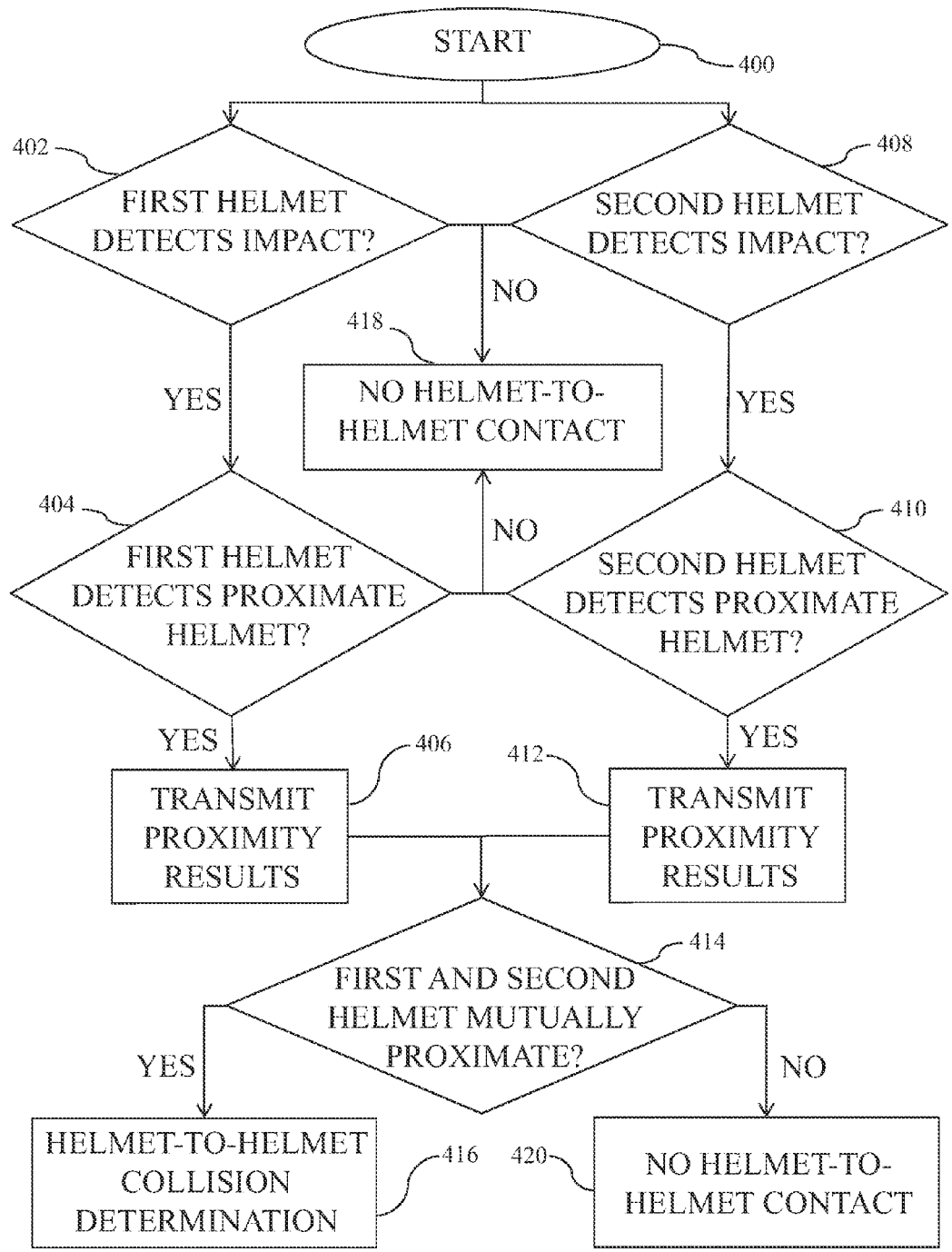
FIG. 4 is a flowchart illustrating the decision making process associated with the system of FIG. 3.

FIG. 4 is a flowchart illustrating the decision making process associated with the system of FIG. 3. The process begins at Step 400. If a first helmet detects an impact in Step 402, the process proceeds to Step 404. If the first helmet detects a proximate helmet, the process proceeds to Step 406, where proximity results are transmitted. If a second helmet detects an impact in Step 408, the process proceeds to Step 410. If the second helmet detects a proximate helmet, the process proceeds to Step 412, where the proximity results are transmitted. If the determinations made in Steps 402, 404, 408, and 410 are negative, Step 418 determines that no helmet-to-helmet contact occurred. In Step 414 the monitor determines if two helmets report mutual proximity. If so, Step 416 determines that it is likely that a helmet-to-helmet collision has occurred between the first and second helmets. If the determination made in Steps 414 is negative, Step 420 determines that no helmet-to-helmet contact occurred.

Figure 5:
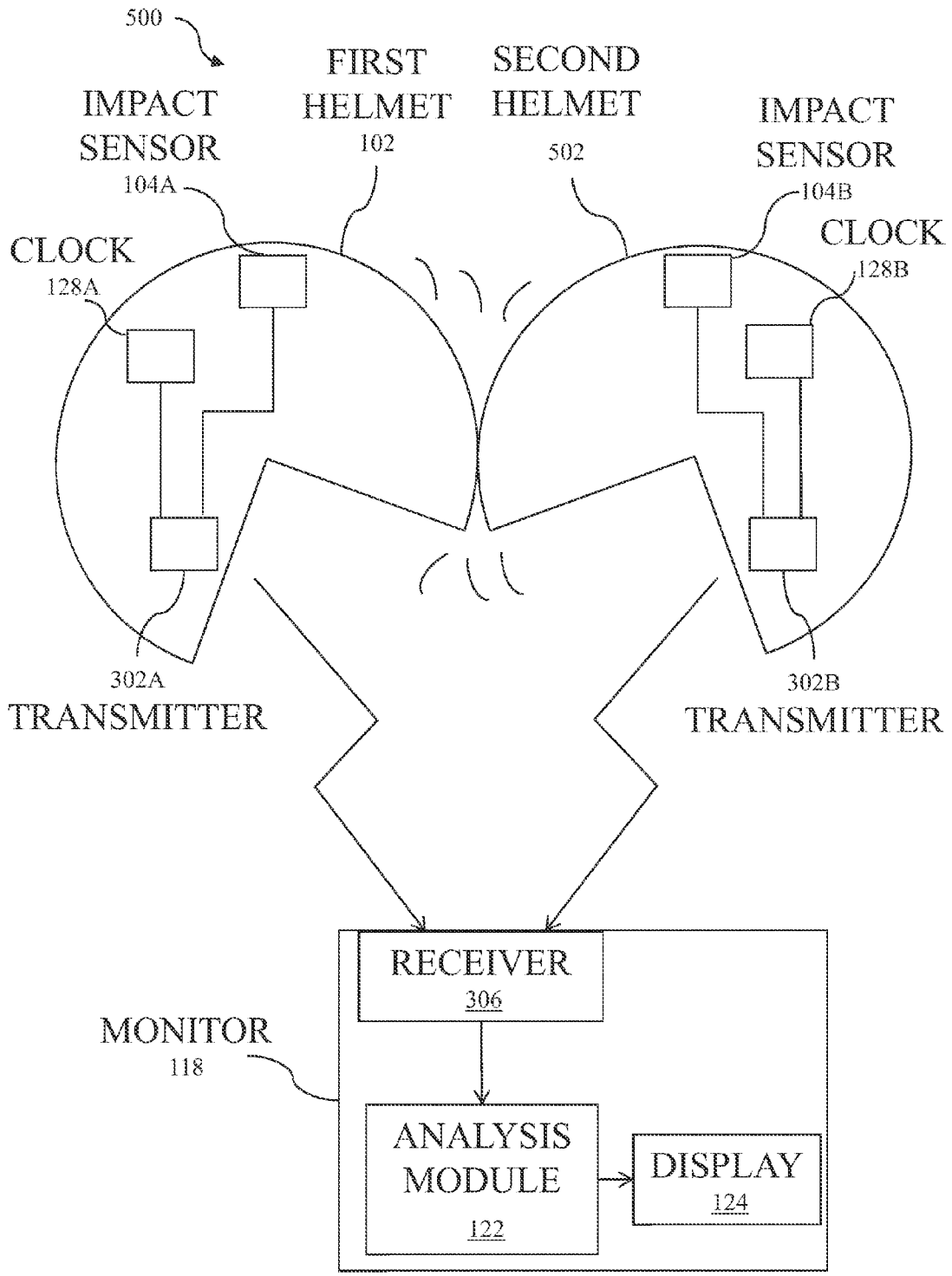
FIG. 5 is a schematic block diagram of a second variation of the system for detecting helmet contact.

FIG. 5 is a schematic block diagram of a second variation of the system for detecting helmet contact. The system 500 comprises a plurality of helmets. Two helmets are shown for the sake of simplicity a first helmet 102 and a second helmet 502. Helmets 102 and 502 comprise an impact sensor, respectively 104a and 104b, as described above, embedded in the helmet to detect a helmet impact. Transmitters 302a and 302b are embedded in the helmets, and respectively connected to the impact sensors 104a and 104b, to transmit impact detection results.

A monitor 118 comprises a receiver 306 for accepting impact detection results transmitted by the plurality of helmets. An analysis module 122 determines if a helmet-to-helmet contact has occurred in response to analyzing the impact detection results from the plurality of helmets. The results of the analysis are presented at interface 124. The analysis module 122 may be enabled as state machine, combinational logic, or with a software application executed by a processor.

As with the helmet described in FIG. 3, each helmet transmitter in system 500 may transmit the detection of an impact exceeding a first impact threshold or actual impact data measurements. Each helmet may further comprise a clock 128a/128b having outputs to supply timestamps, so that each helmet may transmit a timestamp associated with a time of impact occurrence. If the helmet impact sensors are able to detect impact magnitudes, the helmet transmitters may transmit the detected impact magnitude measurements.

Note: if proximity sensors are added to the helmets of system 500, and proximity results are transmitted to the monitor, then system 500 assumes many of the aspect associated with system 300 of FIG. 3.

Figure 6:
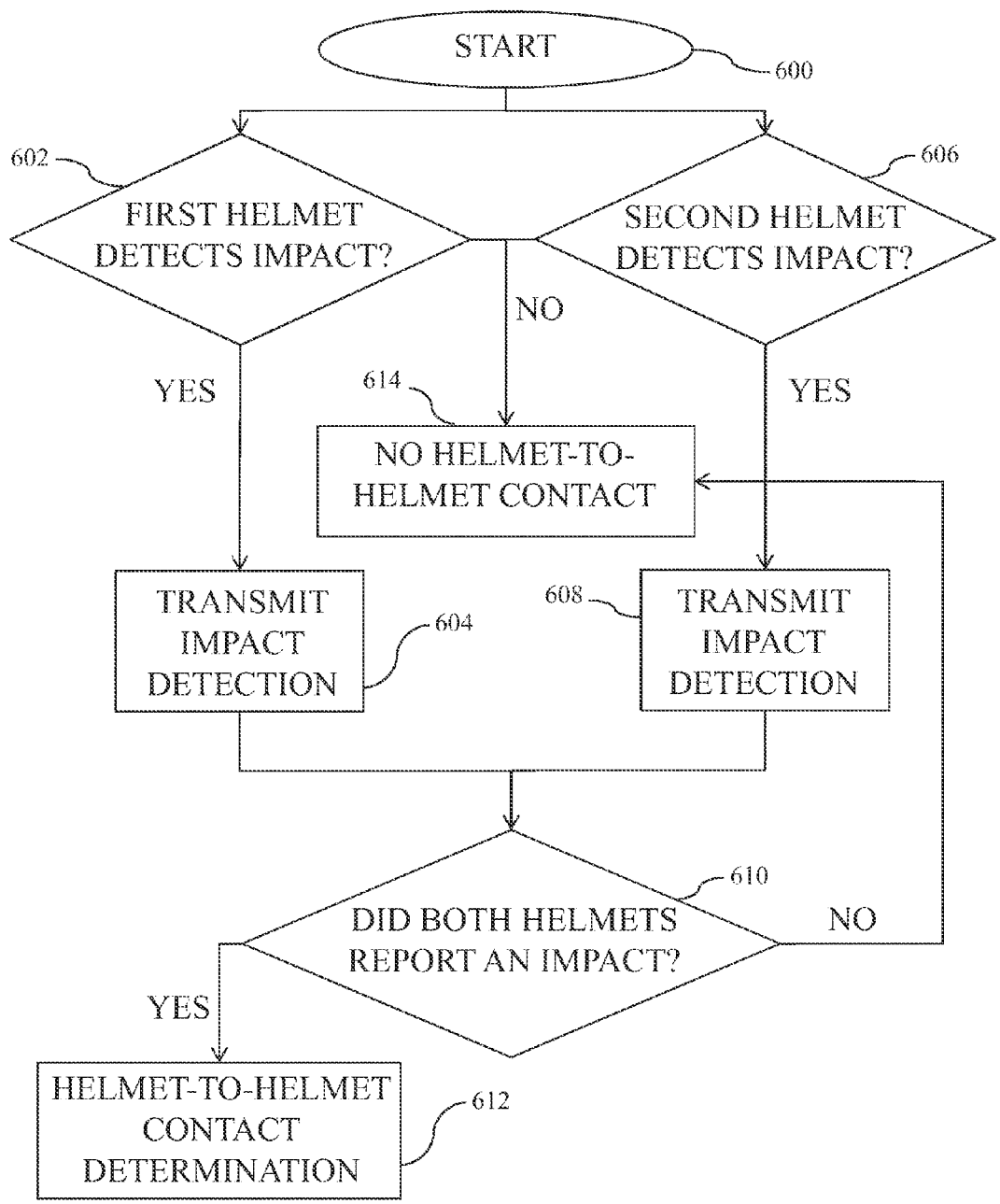
FIG. 6 is a flowchart illustrating the decision making process associated with the system of FIG. 5.

FIG. 6 is a flowchart illustrating the decision making process associated with the system of FIG. 5. The process begins at Step 600. If a first helmet detects an impact in Step 602, the process proceeds to Step 604 where the impact detection is transmitted. If a second helmet detects an impact in Step 606, the process proceeds to Step 608, where the impact detection is transmitted. In Step 610 the monitor determines if two helmets report impacts. If so, Step 612 determines that it is likely that a helmet-to-helmet collision has occurred between the first and second helmets. If the determinations made in Steps 602, 606, and 610 are negative, then no helmet-to-helmet contact occurred (Step 614). Note: the analysis process conducted by the monitor can be fine-tuned using impact timestamp and impact magnitude data.

Figure 7:
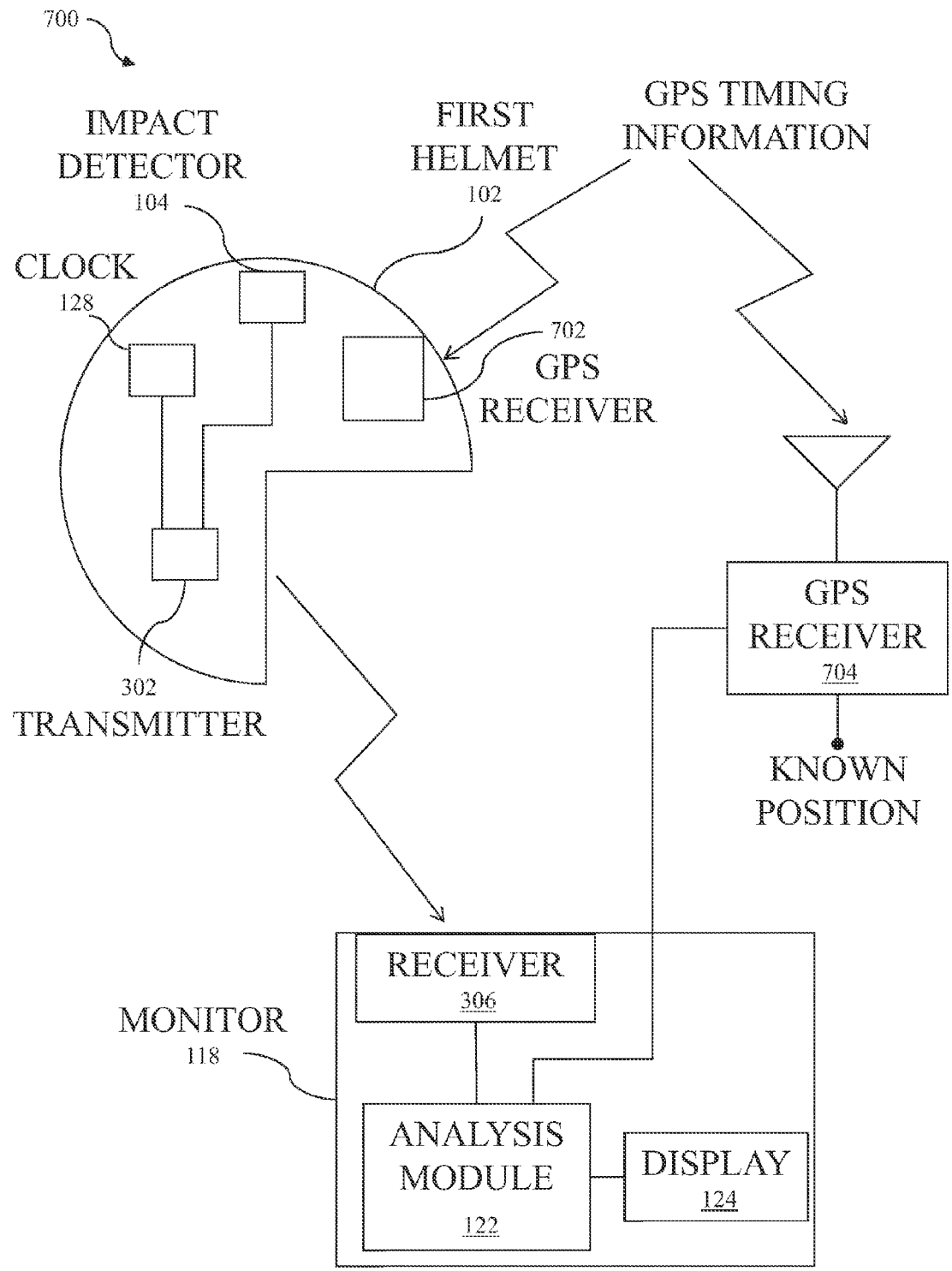
FIG. 7 is a schematic block diagram of a third variation of the system for detecting helmet-to-helmet contact.

FIG. 7 is a schematic block diagram of a third variation of the system for detecting helmet-to-helmet contact. The system 700 comprises a first helmet 102, with an impact sensor 104 embedded in the first helmet to detect a helmet impact. A global positioning satellite (GPS) receiver 702 is embedded in the first helmet 102 to receive location information (timing information with respect to GPS satellites). A transmitter 302 is embedded in the first helmet, and connected to the impact sensor 104 and GPS receiver 702 to transmit impact detection results and location information.

A monitor 118 comprises a receiver 306 for accepting impact detection results and location information transmitted by a plurality of helmets. A reference GPS receiver 704 may be located at a known stationary position, and used by the monitor to remove purposely induced errors added to the GPS signals. Such a system is referred to as a Differential Global Positioning System (DGPS), which improves location accuracy to within about 4 inches. The known position supplies a signal representing the difference between measured satellite pseudoranges and actual (internally computed) pseudoranges, and the monitor corrects any pseudoranges associated with the helmets by the same amount.

An analysis module 122 determines if a helmet-to-helmet contact has occurred in response analyzing the impact detection results and location information from the plurality of helmets. This information permits the analysis module 122 to cross-reference helmet locations to the helmets reporting impacts, as a means of determining helmet-to-helmet collisions. An interface 124 supplies analysis results.

As in the systems above, additional information may be provided to fine-tune the analysis. The first helmet, and by extension all the helmets in the system, may include an embedded clock 128 to supply timestamps, permitting the transmitter 302 to transmit a timestamp associated with a time of impact occurrence. Likewise, if the impact sensor 104 measures impact magnitude, the transmitter 302 may transmit impact magnitude measurements. In one aspect, only impacts exceeding an impact threshold are transmitted by the first helmet.

Figure 8:
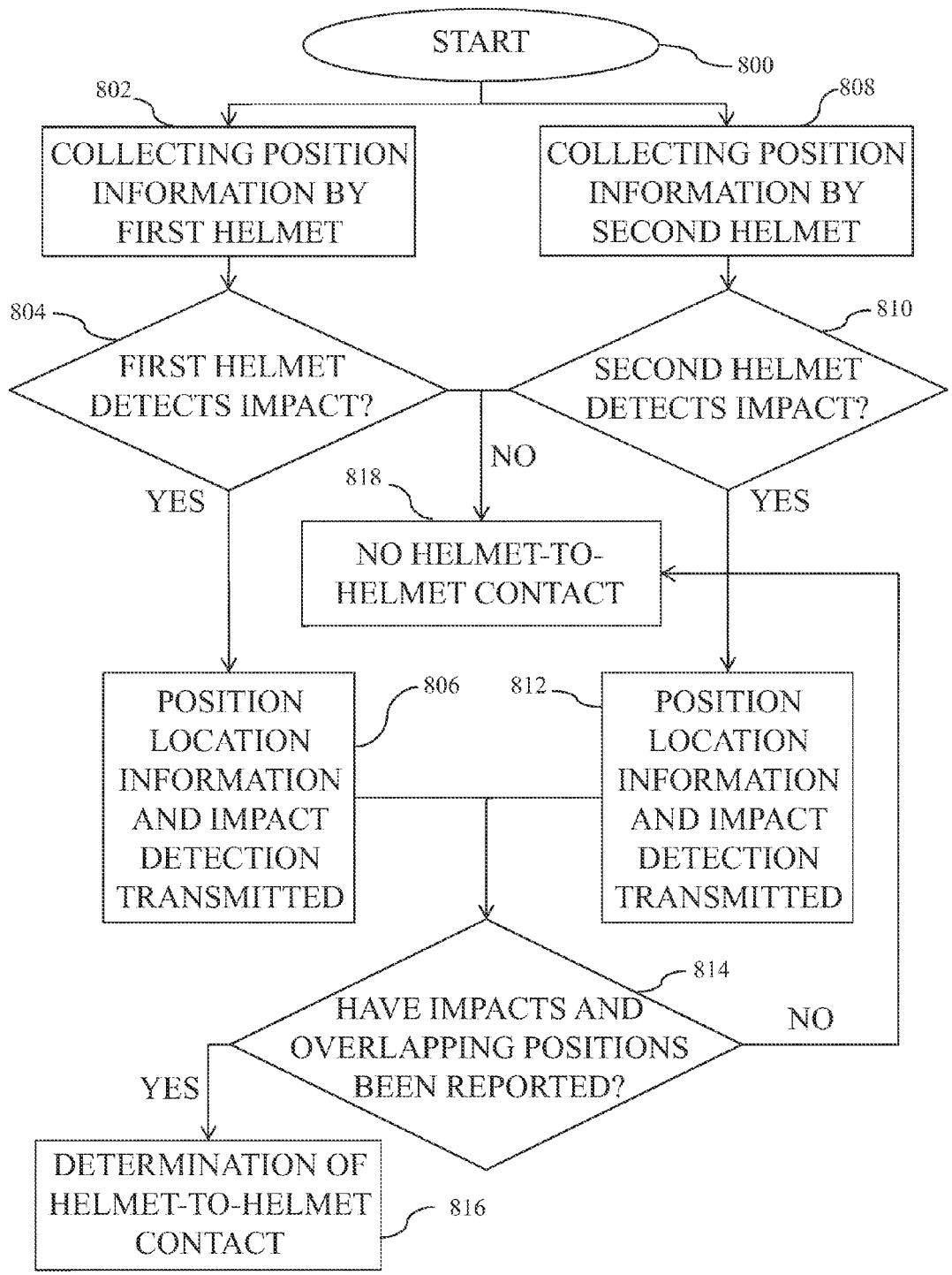
FIG. 8 is a flowchart illustrating the decision process associated with the system of FIG. 7.
Figure 15:
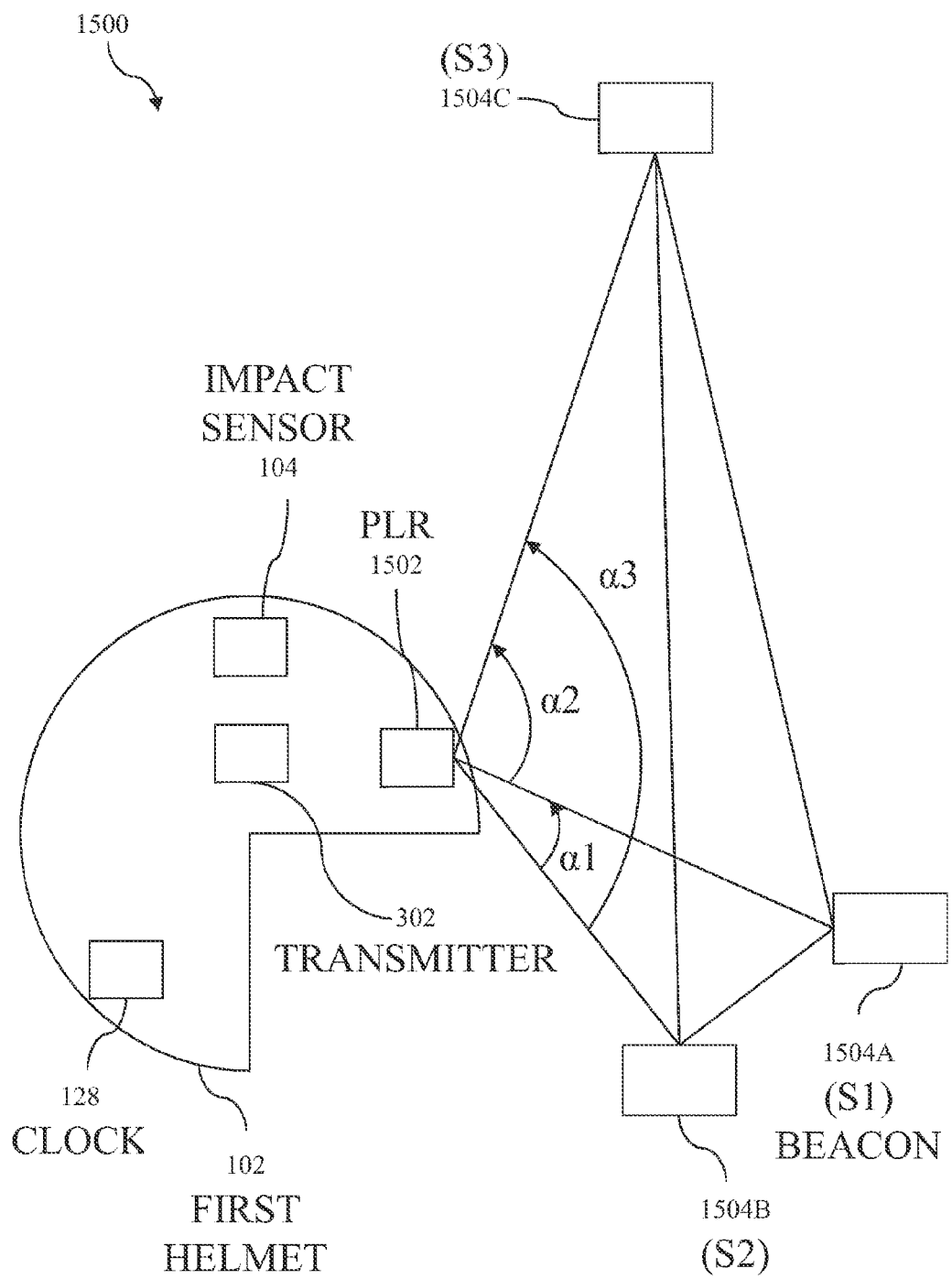
FIG. 15 is a schematic block diagram of another variation of the system for detecting helmet-to-helmet contact.

FIG. 8 is a flowchart illustrating the decision process associated with the systems of FIGS. 7 and 15. The process begins at Step 800. In Step 802 the first helmet collects position location information. In Step 804 the first helmet may detect an impact. In Step 806 the first helmet transmits impact and position location information. In Step 808 the second helmet collects position location information. In Step 810 the second helmet detects an impact. In Step 812 the second helmet transmits impact and position location information. Note: Steps 806 and 812 may transmit the position location information regardless of whether an impact is detected, so that a constant "map" of helmet positions may be maintained by the monitor. In Step 814 the monitor determines if two helmets report impact and overlapping position location information. If so, Step 816 determines that it is likely that a helmet-to-helmet collision has occurred between the first and second helmets. If the determinations made in Steps 804, 810, and 814 are negative, then no helmet-to-helmet contact occurred (Step 818).

Figure 9:
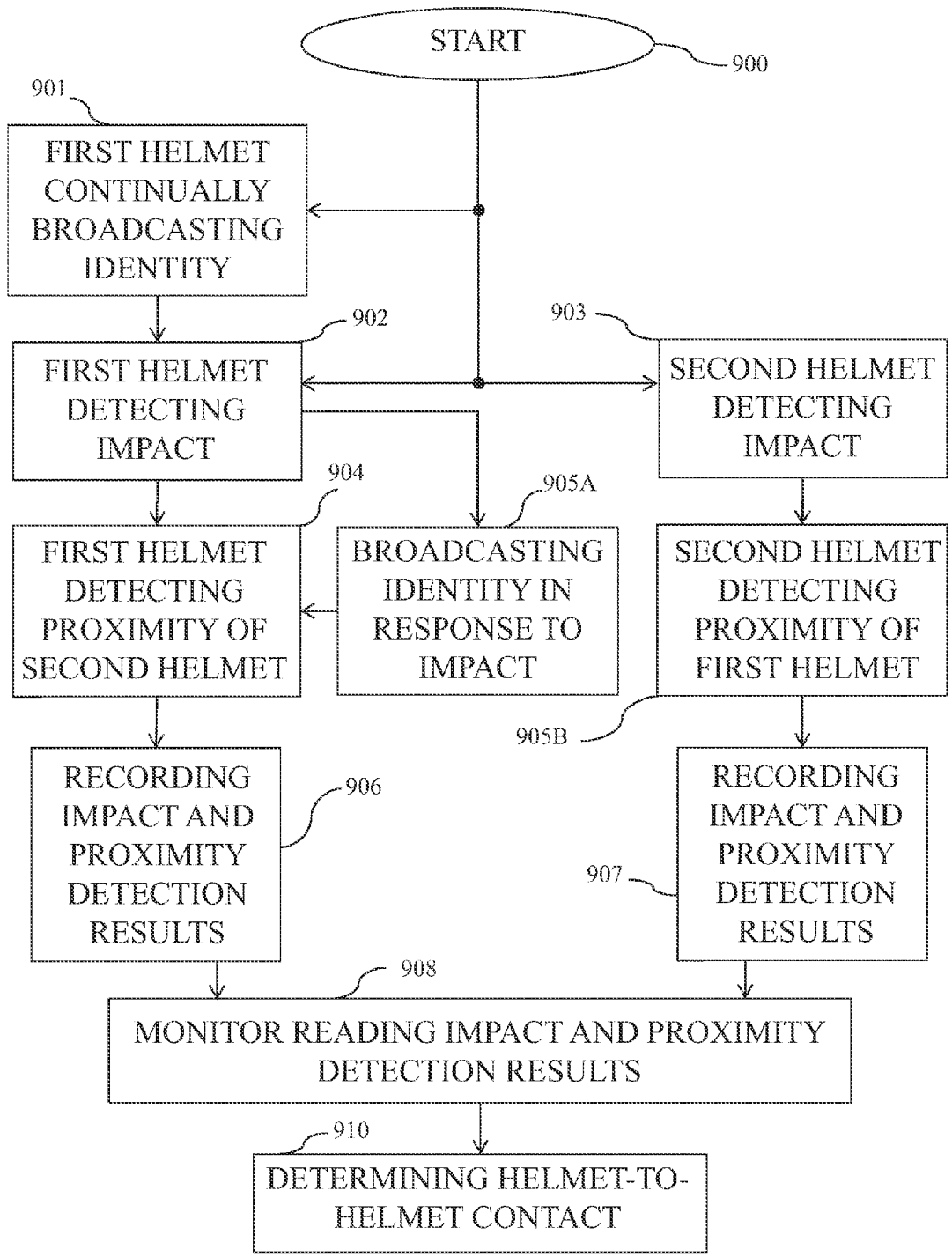
FIG. 9 is a flowchart illustrating a method for detecting helmet-to-helmet contact.

FIG. 9 is a flowchart illustrating a method for detecting helmet-to-helmet contact. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 900.

In Step 902 a first helmet detects an impact. In Step 904 the first helmet detects the proximity of a second helmet. In Step 906 the first helmet records the impact detection results and proximity detection results. In one aspect, the first helmet records the detection of an impact exceeding a first impact threshold. In another aspect, the first helmet records the detection of a proximity signal exceeding a received first signal strength. Step 906 may also record a timestamp associated with a time of impact occurrence, a timestamp associated with a time of proximity detection, or both. In one aspect, if the first helmet measures an impact magnitude in Step 902, the first helmet records the impact magnitude measurement in Step 906.

If the first helmet simultaneously detects a plurality of helmet proximity signals in Step 904, then in Step 906 the first helmet may record the plurality of helmet proximity signals or the helmet having the largest detected proximity signal strength. Simultaneous may be defined as the duration of a play (several seconds), or it may be defined as a time that occurs close in time to the impact detection. For example, simultaneous may be defined as within ±0.5 milliseconds of the impact.

In one aspect, the first helmet broadcasts an identity signal, to be used for first helmet proximity detection. A continuously broadcast identity signal is represented by Step 901, since it is initiated before impact detection. Alternatively, if the identity signal is triggered in response to detecting the impact, it is represented by Step 905a. In another aspect, Step 901 is performed in response to a periodic interrogation, or Step 905a is performed in response to an interrogation from the second helmet. For example, the second helmet may interrogate after it detects an impact in Step 903. Alternatively, the interrogation may be continuous or periodic.

In Step 903 a second helmet detects an impact. In Step 905b the second helmet detects a first helmet proximity signal. In Step 907 the second helmet records the impact detection results and proximity detection results. In Step 908 a monitor reads the impact detection results and proximity detection results from the first and second helmets. In Step 910 the monitor determines that a helmet-to-helmet contact has occurred between the first and second helmets in response to analyzing the impact detection results and proximity detection results.

Figure 10:
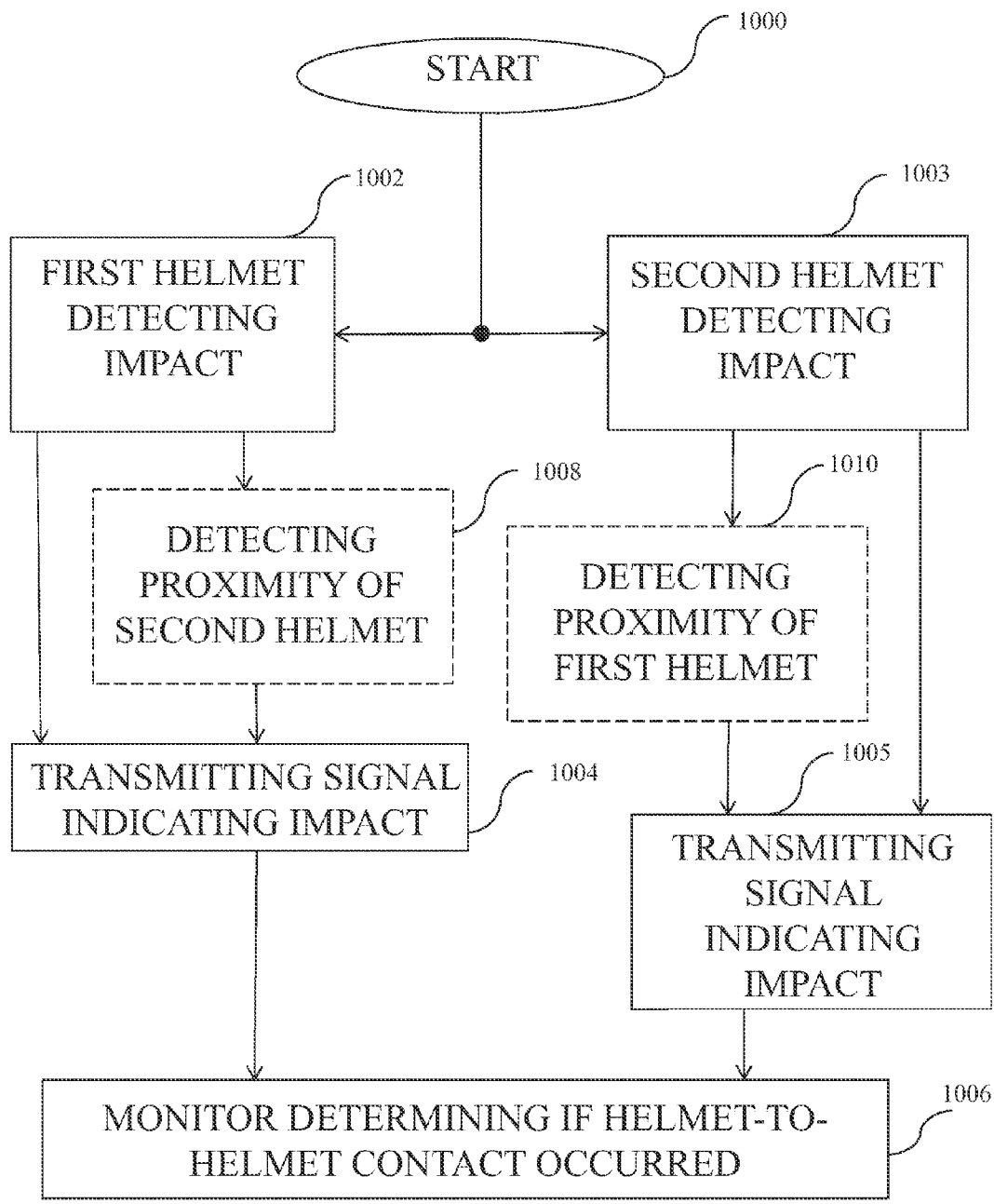
FIG. 10 is a flowchart illustrating a first variation in the method for detecting helmet contact.

FIG. 10 is a flowchart illustrating a first variation in the method for detecting helmet contact. The method begins at Step 1000. In Step 1002 a first helmet detects an impact. In Step 1004 the first helmet transmits a signal indicating a detected impact. In Step 1003 a second helmet detects the impact. In Step 1005 the second helmet transmits a signal indicating a detected impact. In response to analyzing the signal transmissions of first and second helmets, a monitor determines that a helmet-to-helmet contact has occurred between the first and second helmets in Step 1006.

In one aspect, the first helmet transmits a signal in Step 1005 in response to the impact exceeding a first impact threshold. In another aspect, the first helmet transmits a timestamp associated with a time of impact occurrence. If the first helmet measures an impact magnitude in Step 1002, the first helmet may transmit a signal including the impact magnitude measurement in Step 1006. The measurement of impact thresholds and magnitude measurements may be to complex consideration involving several sensors, working independently or in cooperation, or the weighting of sensor data based upon the location of the sensor in the helmet, or the duration over which the impact is measured Optionally (as indicated by the dashed lines forming the box surrounding Step 1008), the first helmet detects the proximity of a second helmet in Step 1008, and the second helmet detects the proximity of the first helmet in Step 1010. Then, Step 1004 includes the first helmet transmitting a signal indicating the detected impact and the detected second helmet proximity, and Step 1005 includes the second helmet transmitting a signal indicating the detected impact and the detected first helmet proximity. In Step 1006 the monitor determines that a helmet-to-helmet contact has occurred in response to analyzing the detected impact and detected helmet proximity transmitted by the first and second helmets.

In one aspect, Step 1008 includes the first helmet detecting a second helmet identity signal. Then, Step 1004 includes the first helmet transmitting the detected second helmet proximity in response to the second helmet identity signal exceeding a measured first signal strength in Step 1008. The process would be similar for the second helmet detecting a first helmet identity signal.

Figure 11:
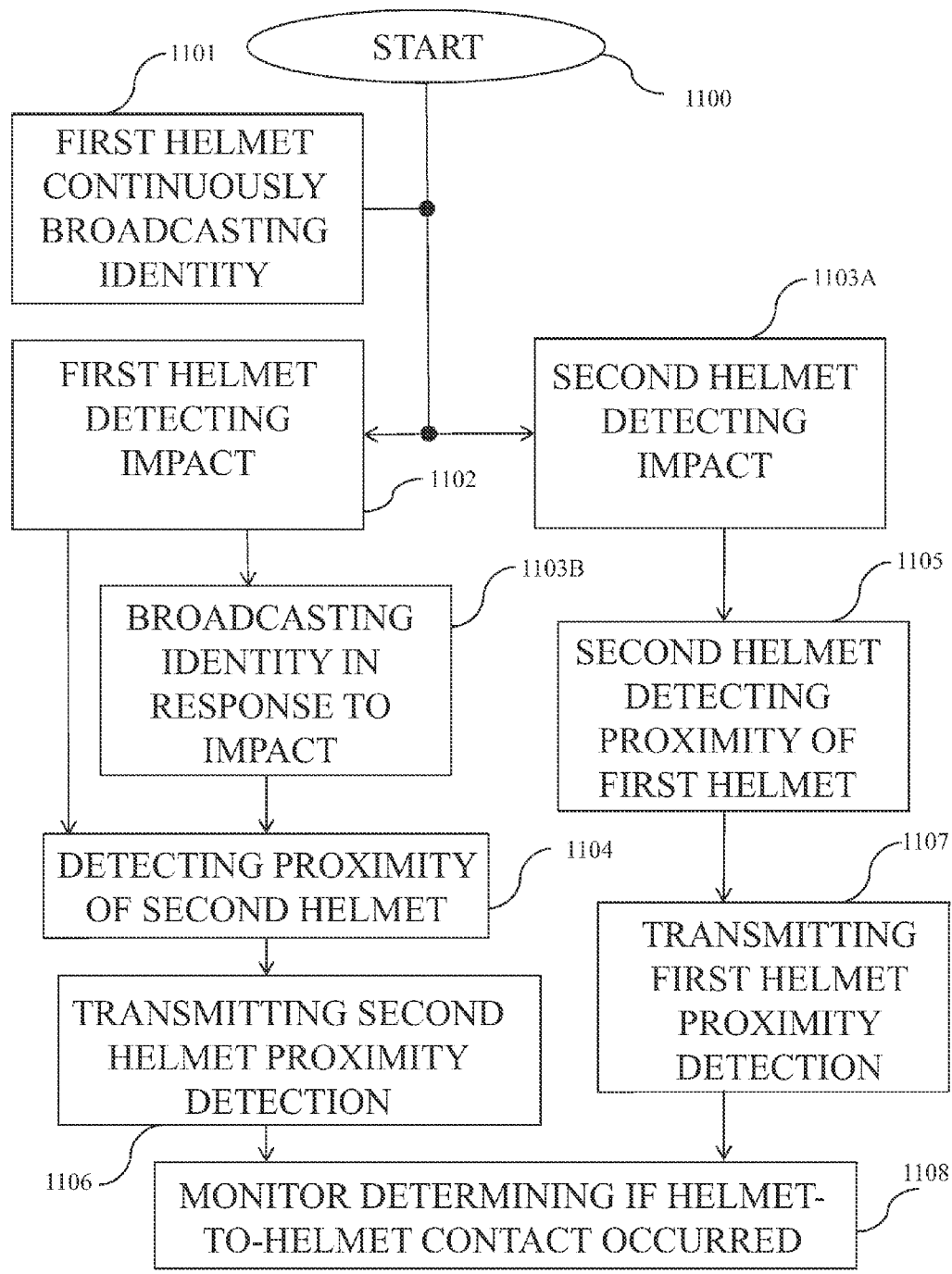
FIG. 11 is a flowchart illustrating a second variation of the method for detecting helmet-to-helmet contact.

FIG. 11 is a flowchart illustrating a second variation of the method for detecting helmet-to-helmet contact. The method begins at Step 1100. In Step 1102 a first helmet detects an impact. In Step 1104 the first helmet detects the proximity of a second helmet. In response to detecting the impact, in Step 1106 the first helmet transmits second helmet proximity detection results. Likewise, in Step 1103a the second helmet detects the impact, and in Step 1105 the second helmet detects the proximity of the first helmet. In response to detecting the impact, in Step 1107 the second helmet transmits first helmet proximity detection results to the monitor. In Step 1108 the monitor determines that a helmet-to-helmet contact has occurred in response to analyzing the first helmet proximity detection results and the second helmet proximity detection results. In this method the monitor performs an analysis based only upon reported proximity data. However, proximity data is only reported by helmets detecting an impact. As an option, when the first helmet transmits second helmet proximity detection results in Step 1006, the first helmet may transmit a code identifying the first helmet as the source of the transmission. With this option, the monitor is able to compare proximity data to the helmets reporting the proximity data for a more detailed analysis.

In one aspect, the first helmet transmits the second helmet proximity detection results in Step 1106 if the impact exceeds a first impact threshold. In another aspect, Step 1104 includes the first helmet detecting a second helmet identity signal, and in Step 1106 the first helmet transmits the second helmet proximity detection results in response to the second helmet identity signal exceeding a first signal strength, as measured in Step 1104. Further, the first helmet may transmit the second helmet proximity detection results with a timestamp associated with a time of impact occurrence.

In another aspect, the first helmet measures an impact magnitude in Step 1102, and in Step 1106 the first helmet transmits the second helmet proximity detection results, along with the impact magnitude measurement.

In one aspect, the first helmet detects the proximity of a plurality of helmets in Step 1104, and in Step 1006 the first helmet transmits proximity detection results for the plurality of helmets, for a helmet having a largest measured identity signal strength, or for any helmet exceeding an identity signal threshold signal strength.

In another aspect, the first helmet broadcasts a first helmet identity signal, to be used for first helmet proximity detection. If the identity signal is broadcast in response to detecting the impact, it is represented by Step 1103b. If the identity signal is broadcast continuously, it is represented by Step 1101. The second helmet would broadcast an identity signal in a similar manner. In another aspect, Step 1101 is performed in response to a periodic interrogation, or Step 1103b is performed in response to an interrogation from the second helmet. For example, the second helmet may interrogate after it detects an impact in Step 1103a. Alternatively, the interrogations may be continuous or periodic.

Figure 12:
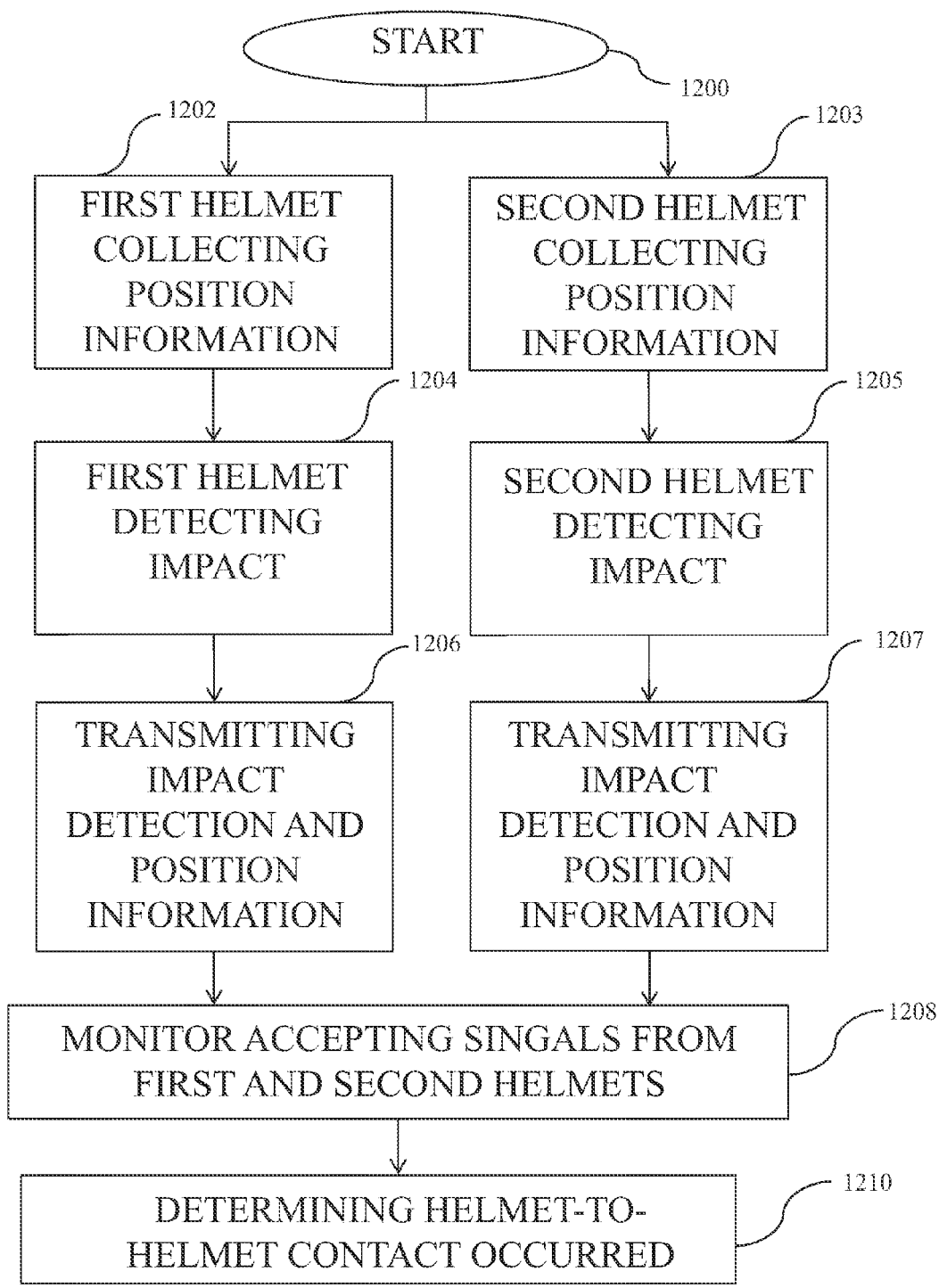
FIG. 12 is a flowchart illustrating a third variation of the method for detecting helmet contact.

FIG. 12 is a flowchart illustrating a third variation of the method for detecting helmet contact. The method begins at Step 1200. In Step 1202 a first helmet collects position information (e.g., GPS or triangulation). In Step 1204 the first helmet detects an impact. In Step 1206 the first helmet transmits a signal indicating the detected impact and the collected position information. In Step 1208 a monitor accepts the signal from the first helmet. In response to analyzing the first helmet signal, in Step 1210 the monitor determines that a helmet-to-helmet contact has occurred.

Likewise, in Step 1203 a second helmet collects position information. In Step 1205 the second helmet detects the impact. In Step 1207 the second helmet transmits a signal indicating the detected impact and the collected position information. Then, in Step 1208 the monitor accepts the signal from the second helmet, and in Step 1210 the monitor determines the helmet-to-helmet contact in response to analyzing the signals transmitted by the first and second helmet.

In one aspect, the first helmet transmits a signal with a timestamp associated with a time of impact occurrence in Step 1206. In another aspect, the first helmet measures an impact magnitude in Step 1204, and in Step 1206 the first helmet additionally transmits the impact magnitude measurement.

Figure 13A:
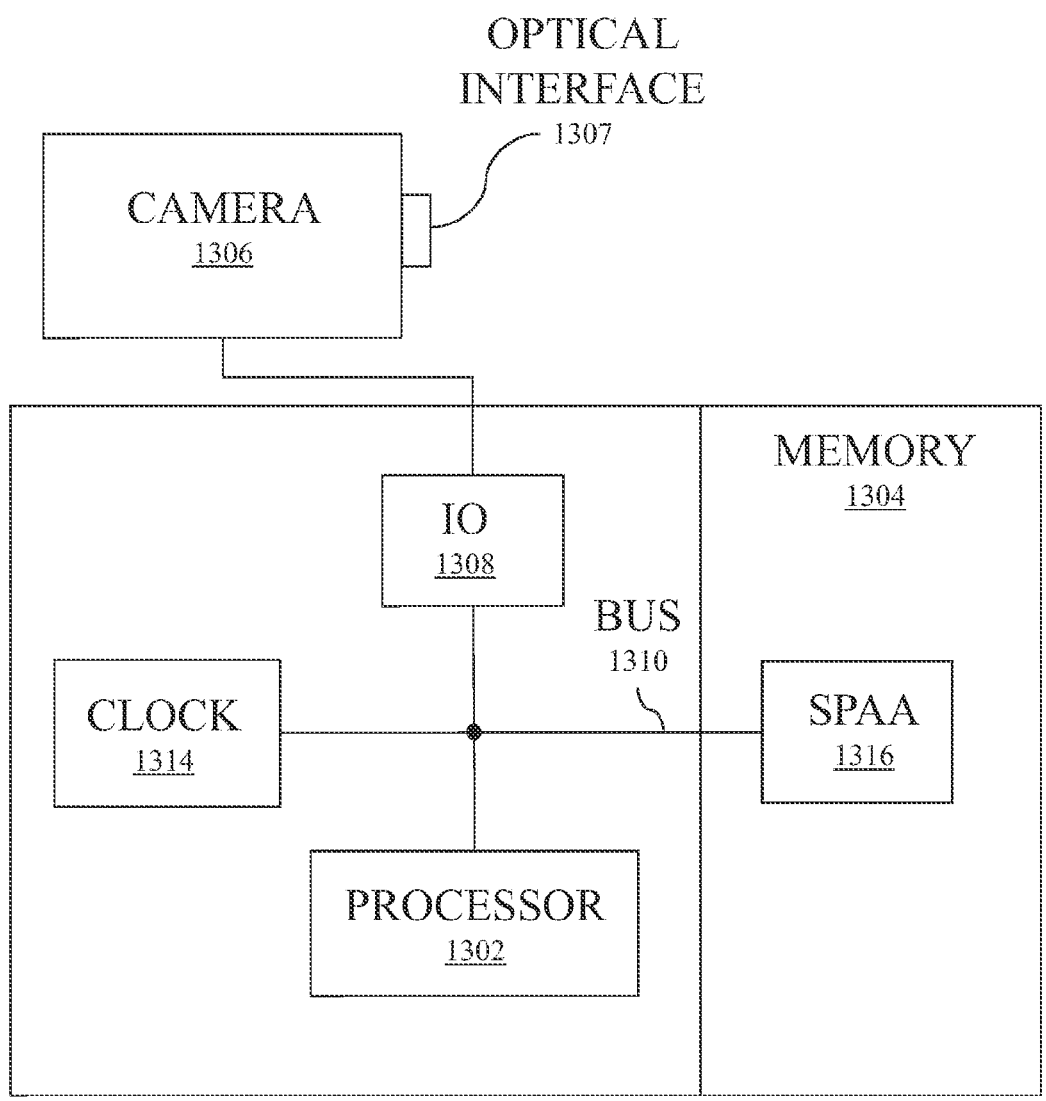
FIGS. 13A through 13E are schematic block diagrams depicting a system for determining player positioning.
Figure 13B:
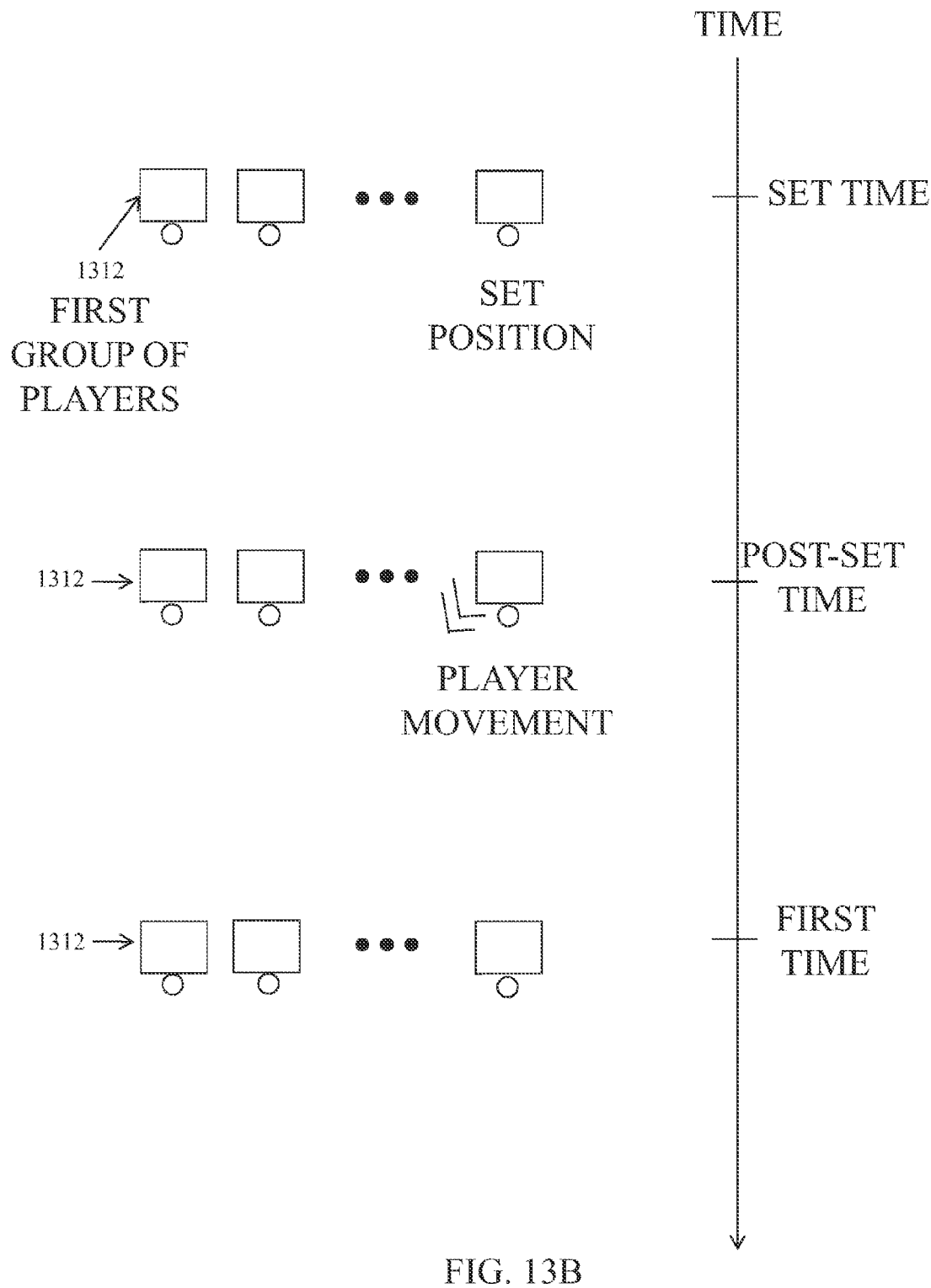

FIGS. 13A through 13E are schematic block diagrams depicting a system for determining player positioning. As shown in FIG. 13A, the system 1300 comprises a processor 1302 and a non-transitory memory 1304. The system includes a camera 1306, with an optical interface 1307, connected to the processor 1302 and memory 1304 via an input/output (IO) interface 1308 and a bus 1310. The camera 1306 images at least a first group of players and stores the images in the memory 1304. A clock 1314 has an output connected to the bus 1310 for cross-referencing images to time of occurrence. A set position analysis application (SPAA) 1316 is enabled as a sequence of software instructions stored in the memory 1304 and enabled by the processor 1302. As depicted in FIG. 13B, the set position analysis application analyzes the images of the first group of players between a first time, when a game exercise is initiated (e.g., the ball is hiked), and a set time, when the offensive players assume a stationary position before the first time, to determine player movement occurring at a post-set time, between the set and first times. In other words, an analysis is performed to determine if one of the offensive players moved after being set, but before the ball was hiked.

Figure 13C:
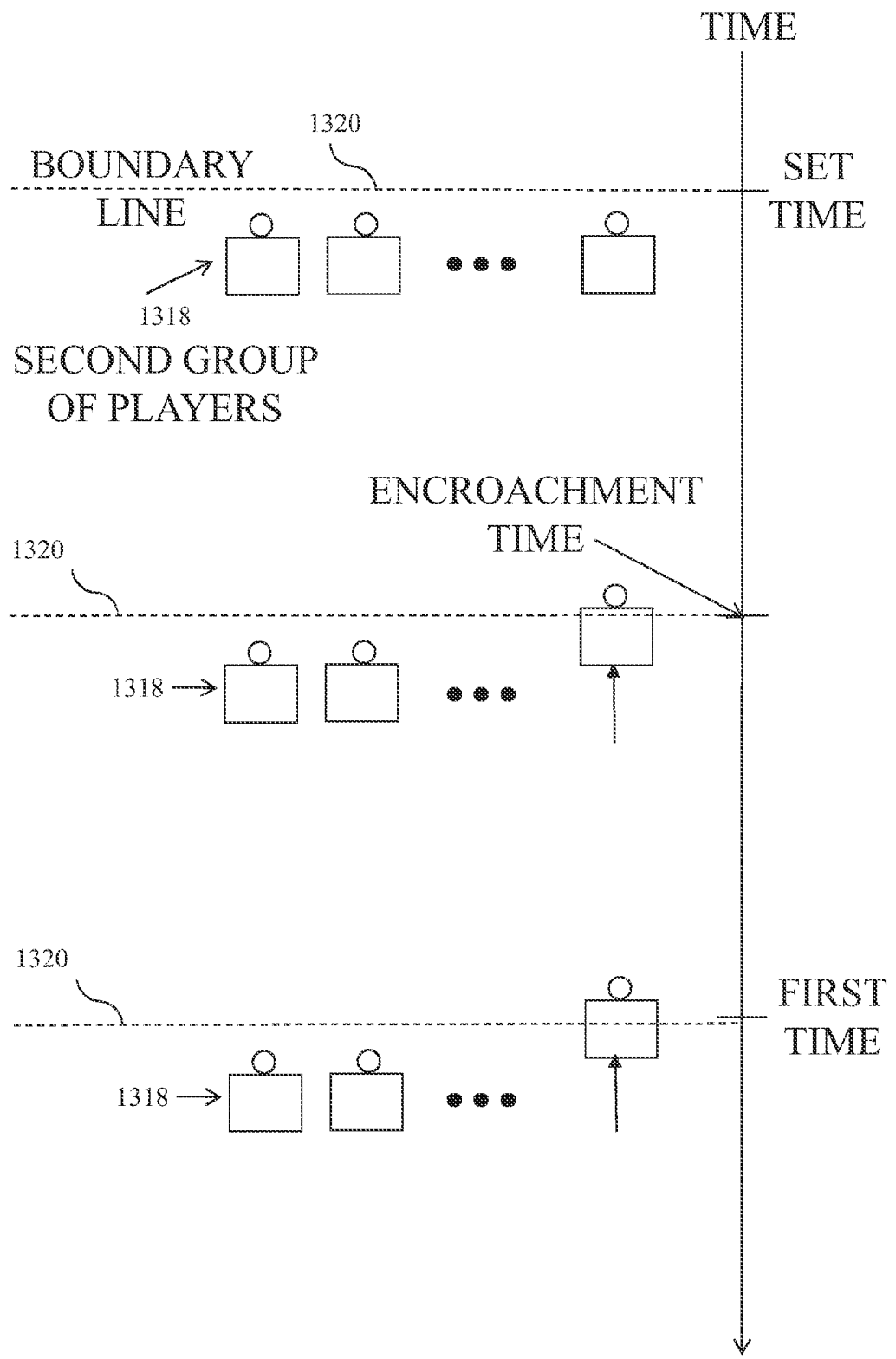

In FIG. 13C, the camera images a second group of players 1318 and stores the images in memory. In this aspect, the set position analysis application analyzes the images of the second group of players 1318, to determine if and when a member of the second group of players crosses a game boundary line 1320 at an encroachment time, after the set time but prior to the first time. In other words, an analysis is performed to determine if one of the defensive players crosses the line of scrimmage after the offensive players are set, but before the ball is hiked. Image analysis software currently exists that could be modified by a person with skill in the art to analyze player motion with respect to a temporal reference such as hiking the ball. Additional cameras, not shown, may be added to the system to detect motion from a larger number of angles.

Figure 13D:
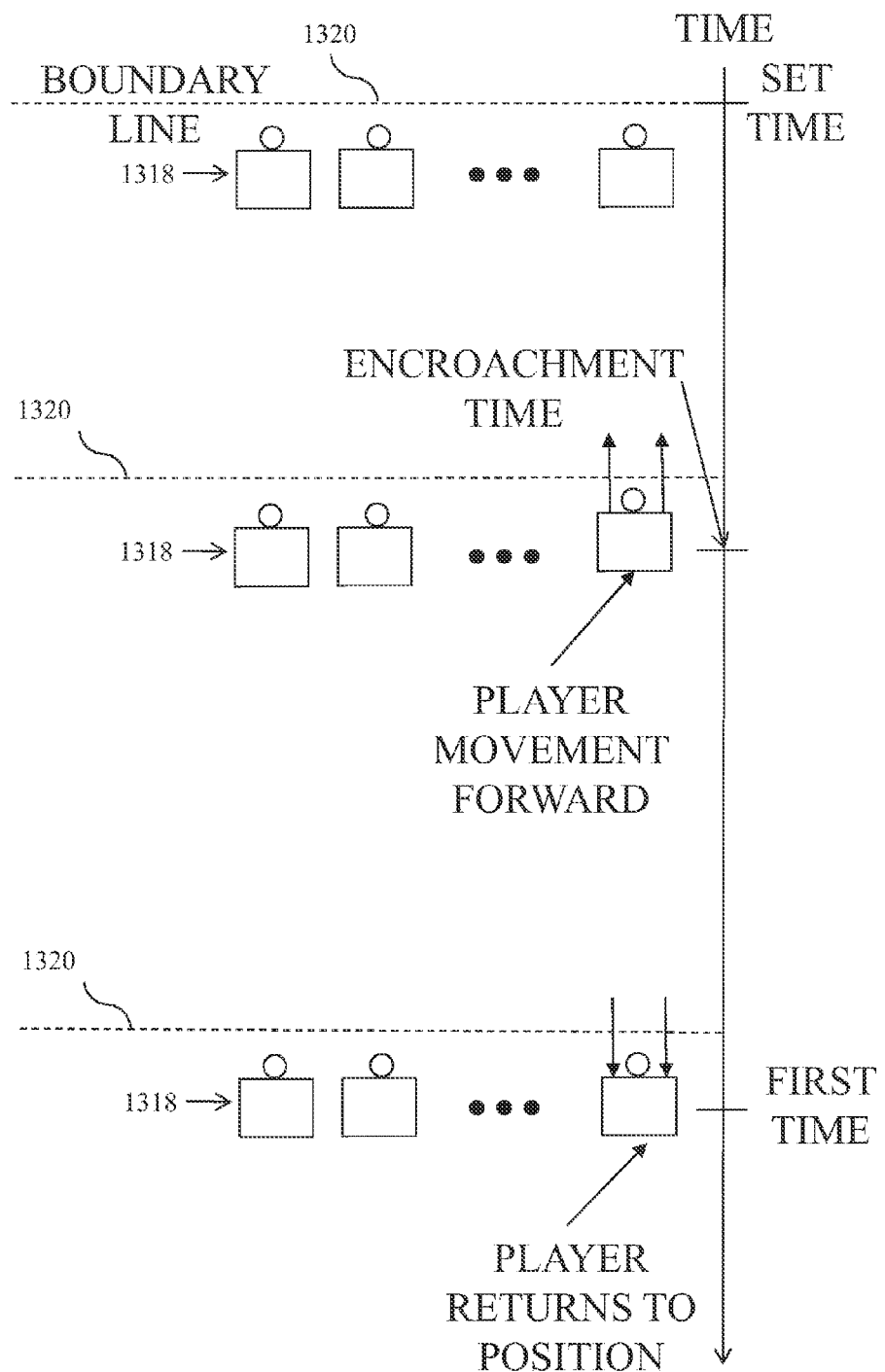

In another aspect, as shown in FIG. 13D, the set position analysis application analyzes the images of the second group of players 1318 prior to the first time, to determine the movement of a member of the second group of players towards the game boundary line occurring at an encroachment time, between the set time and the first time. In other words, an analysis is performed to determine if a defensive player "threatened" to cross the line of scrimmage.

Figure 13E:
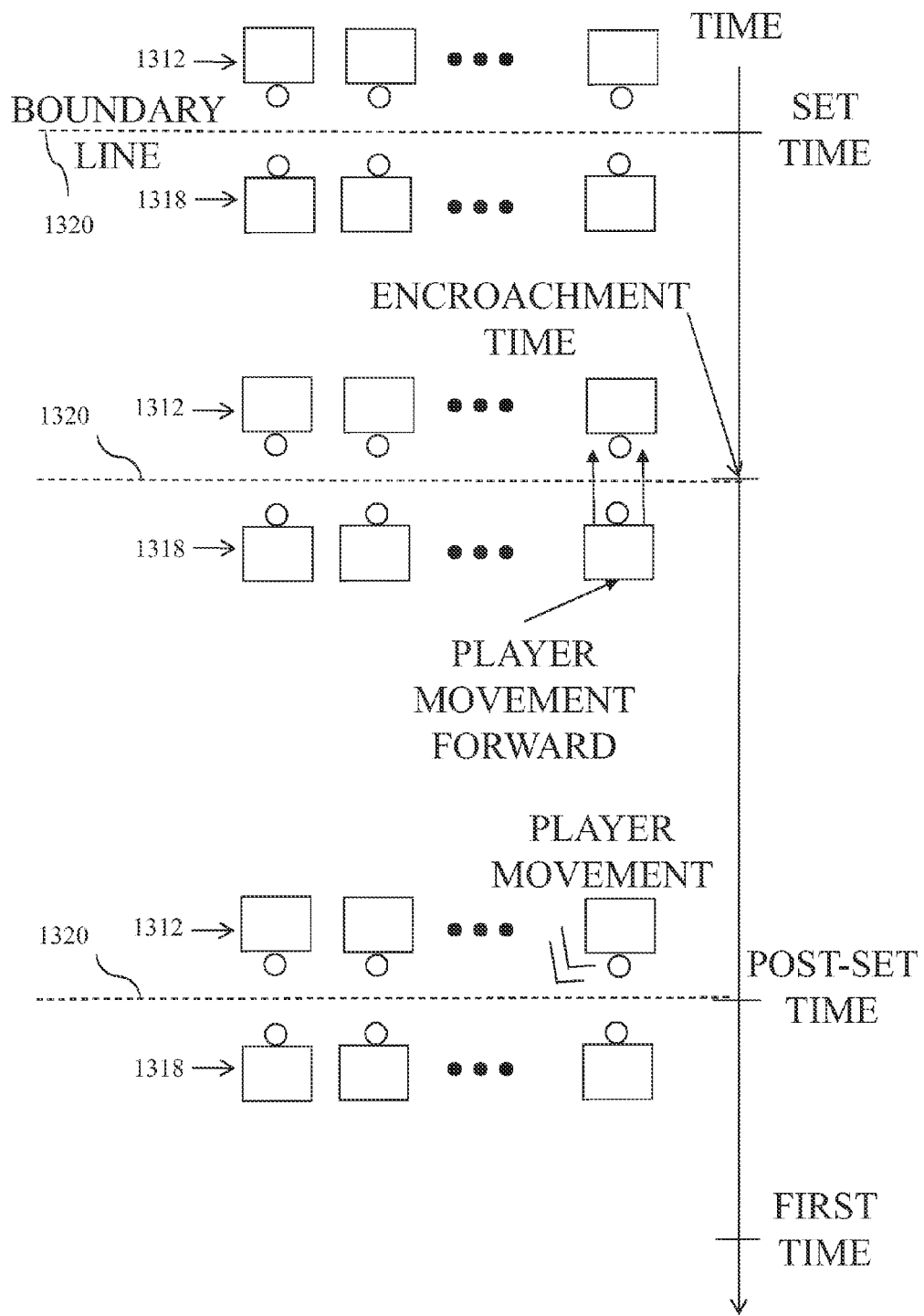

Further, as shown in FIG. 13E, the set position analysis application may analyze the images of a member of the first group of players 1312 found to move at the post-set time, to determine a relationship between the movement of the member of the first group of players and the movement of the member of the second group of players. The movement of the member of the second group of players occurring at the encroachment time may be analyzed with respect to the second group member's rate of position change, the second group member's position with respect to the game boundary, or combinations thereof. In other words, an analysis is performed to determine if a movement by a defensive player, towards the line of scrimmage, caused an offensive player to move in self-defense at the post-set time, prior to the first time.

Figure 14:
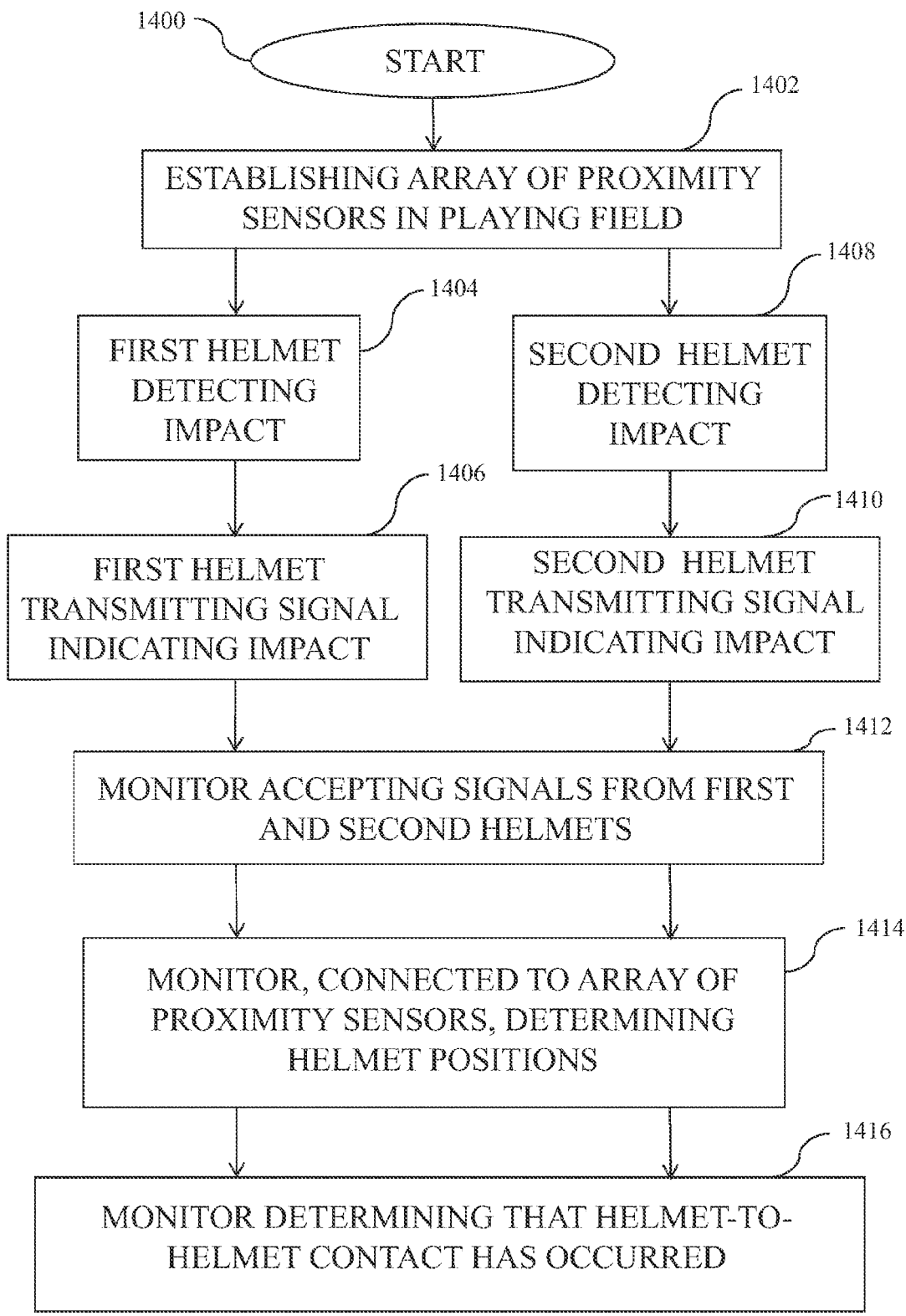
FIG. 14 is a flowchart illustrating another method for detecting helmet contact.

FIG. 14 is a flowchart illustrating another method for detecting helmet contact. The method begins at Step 1400. Step 1402 establishes an array of proximity sensors embedded in a game playing field. For example, the sensors may be embedded in the ground of a playing field, below the surface. The sensors may be evenly distributed to promote accurate coverage. The sensors are able to detect identity signals that are broadcast by the helmets either continuously, or after an impact. In Step 1404 a first helmet detects an impact. In Step 1406 the first helmet transmits a signal indicating a detected impact. In Step 1408 a second helmet detects the impact. In Step 1410 the second helmet transmits a signal indicating the detected impact. In Step 1412 a monitor accepts the signals indicating detected impacts from the first and second helmets. In Step 1414 the monitor, connected to the array of proximity detectors, determines the positions of the first and second helmets on the playing field. The connection between the array of proximity sensors and the monitor may be wired or wireless. A greater number of sensors embedded in the field promotes a more accurate detection of helmets. In one aspect, the detection of a helmet by multiple sensors permits the helmet to be located by a triangulation method, signal strength method, or a combination of the two. In response to analyzing the signals indicating the detected impacts and the positions of the first and second helmets, the monitor determines that a helmet-to-helmet contact has occurred between the first and second helmets in Step 1416.

FIG. 15 is a schematic block diagram of another variation of the system for detecting helmet-to-helmet contact. The system 1500 comprises a first helmet 102. A position location receiver (PLR) 1502 is embedded in the first helmet 102 to receive location (timing) information with respect to beacons 1504a, 1504b, and 1504c mounted around the playing field. Typically, the signaling to the beacons is a form of wireless or radio frequency (RF) communication. It may be possible to use a system of lasers to collect helmet position location data, but safety may be a concern. As is well known in the art, the position of an object in a three-dimensional field can be calculated based upon the relationship of that object, in this case a helmet, to at least three known positions using conventional trigonometric relationships. The position data, then, is the time delay associated with a helmet receiving a signal from a position beacon 1504, and the known relationship between the position beacons in three-dimensional space. In one aspect, the beacons 1504 interrogate the helmets and measure the delay in acknowledgements sent by the helmets. Alternatively, the helmets compare predetermined periodic beacon signal timing to a precision internal clock 128, or the helmets compare a timestamp in the beacon signal to clock reference.

Using one method, the PLR 1502 calculates the position by constructing a triangle between the beacons 1504 using a first side (S3S1) having a known value, a second side (S3S2) having a known value, and a third side (S1S2) having a known value. Using the time delay information and the trigonometric relationships, the unknown angles, and hence the helmet position, can be determined.

It should be understood that the same result can be achieved using corollaries and well known variations of the above-referenced formulas to find helmet position.

A transmitter 302 is embedded in the first helmet, and connected to the PLR to transmit location information. The system monitor analysis module (122, see FIG. 3) determines if a helmet-to-helmet contact has occurred in response analyzing the impact detection results and location information from the plurality of helmets. This information permits the analysis module to cross-reference helmet locations to the helmets reporting impacts, as a means of determining helmet-to-helmet collisions.

As in the systems above, additional information may be provided to fine-tune the analysis. The first helmet, and by extension all the helmets in the system, may include an embedded clock (128, see FIG. 3) to supply time-of-impact timestamps, permitting the transmitter 302 to transmit a timestamp associated with a time of impact occurrence.

In one aspect as shown, the helmet 102 may include an impact sensor 104 embedded in the first helmet to detect helmet impacts, and the transmitter 308 additionally transmits detected impact information. In this aspect, the monitor calculates the probability of helmet impacts using both the transmitted location and impact information. Likewise, if the impact sensor 104 measures impact magnitude, the transmitter 302 may transmit impact magnitude measurements. In one aspect, only impacts exceeding an impact threshold are transmitted by the first helmet.

Alternatively, the helmets may record the location and impact information in a memory, such as the memory 108 shown in FIG. 3, or both transmit and store the information in helmet memory. In yet another variation, the helmet may include a proximity sensor, such as proximity sensor 106 shown in FIG. 3 to supplement the transmitted and/or stored impact and location information.

Figure 16:
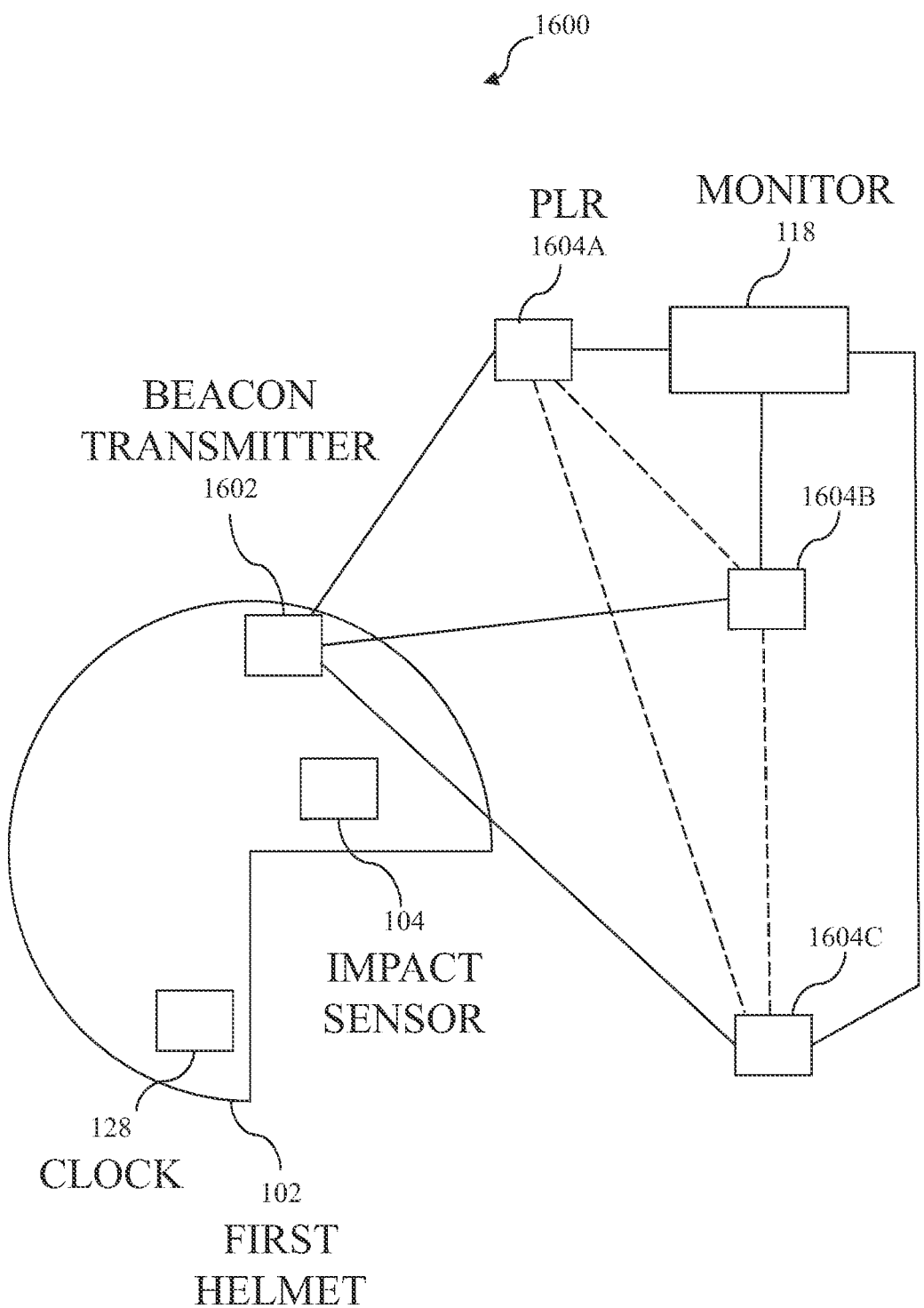
FIG. 16 is a schematic diagram depicting a variation of the system of FIG. 15.

FIG. 16 is a schematic diagram depicting a variation of the system of FIG. 15. In this variation, the helmets (e.g., helmet 102) include a beacon transmitter 1602 that transmits signals which are received by a plurality of position location receivers 1604 located in known positions around the playing field. Typically, the signals are wireless of RF communications. As explained above, the position of an object in a three-dimensional field can be calculated based upon the relationship of that object, in this case a helmet, to at least three known positions using conventional trigonometric relationships. In this case, the helmets may transmit signals at a predetermined time, which each PLR compares to an internal clock reference. Alternatively, the beacon transmissions may be responsive to PLR interrogations, and a measurement of delay in the acknowledgements is compared to a time reference. In one aspect, helmets may collect, record, and/or transmit beacon transmitter time delays from other helmets.

In one simple aspect, the monitor 118 determines if a helmet-to-helmet contact has occurred in response to analyzing just the location information. In another aspect, the helmet includes an impact sensor 104, and the beacon transmitter 1602, or a different transmitter (e.g., transmitter 302, see FIG. 3), transmits the impact detection results. This information permits the monitor 118 to cross-reference helmet locations to the helmets reporting impacts, as a means of determining helmet-to-helmet collisions. Likewise, if the impact sensor 104 measures impact magnitude, the transmitter 302 may transmit impact magnitude measurements. In one aspect, only impacts exceeding an impact threshold are transmitted by the first helmet.

As in the systems above, additional information may be provided to fine-tune the analysis. The first helmet, and by extension all the helmets in the system, may supply timestamps, permitting the transmission of a timestamp associated with a time of impact occurrence.

Alternatively, the helmets may record the location and impact information in a memory, such as the memory 108 shown in FIG. 3, or both transmit and store the information in helmet memory. In yet another variation, the helmet may include a proximity sensor, such as proximity sensor 106 shown in FIG. 3 to supplement the timestamped, transmitted, and/or stored impact and location information.

Figure 20:
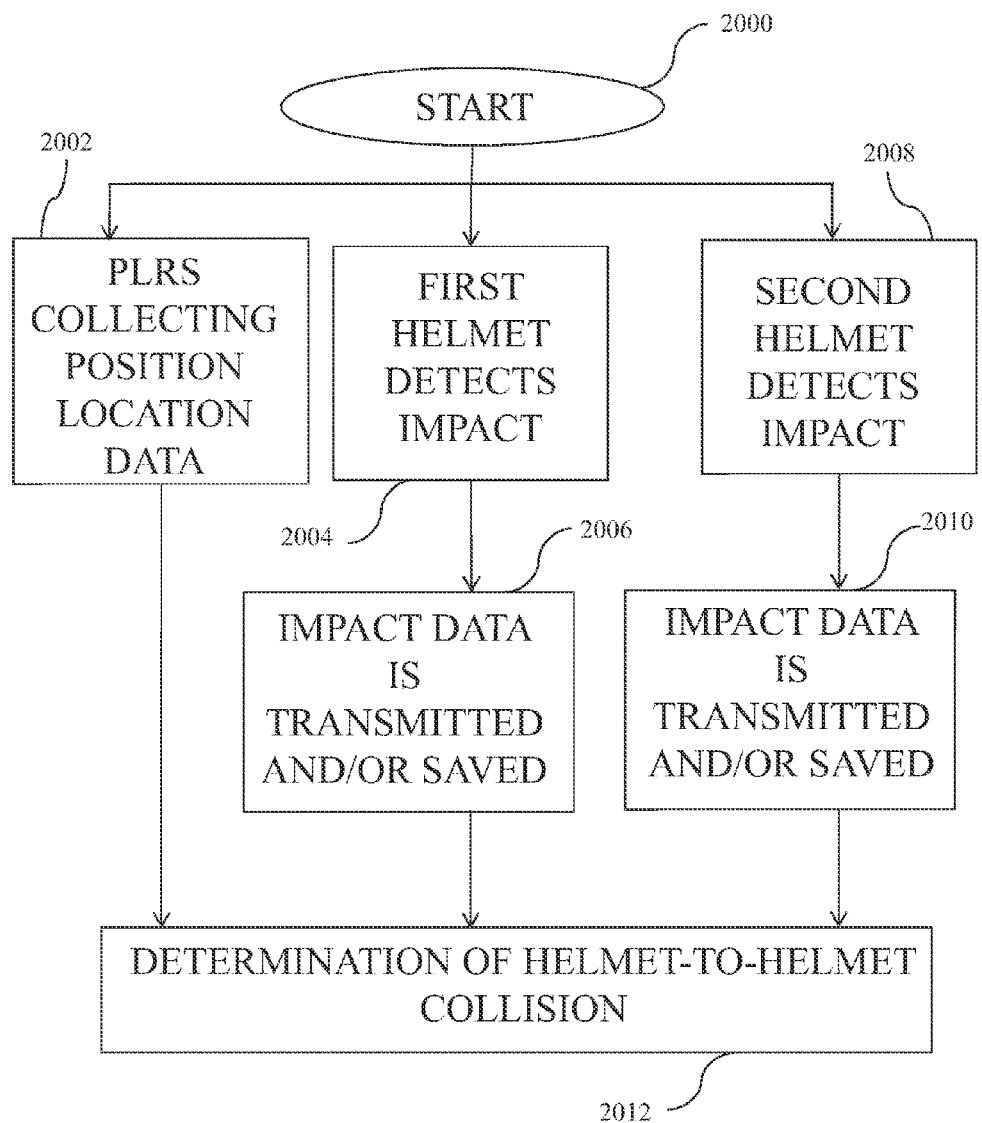
FIG. 20 is a flowchart illustrating the process associated with the system of FIG. 16.

FIG. 20 is a flowchart illustrating the process associated with the system of FIG. 16. The method begins at Step 2000. In Step 2002 PLRs collect position location data for a plurality of helmets. In Step 2004 a first helmet detects an impact. In Step 2006 this impact data is transmitted and/or saved in local memory. In Step 2008 a second helmet detects an impact. In Step 2010 this impact data is transmitted and/or saved in local memory. In Step 2012 a monitor uses the position location and impact data to determine if a helmet-to-helmet collision has occurred. As in the methods above, the decision making process may be refined with the use of timestamp, impact magnitude, and proximity data.

Figure 17:
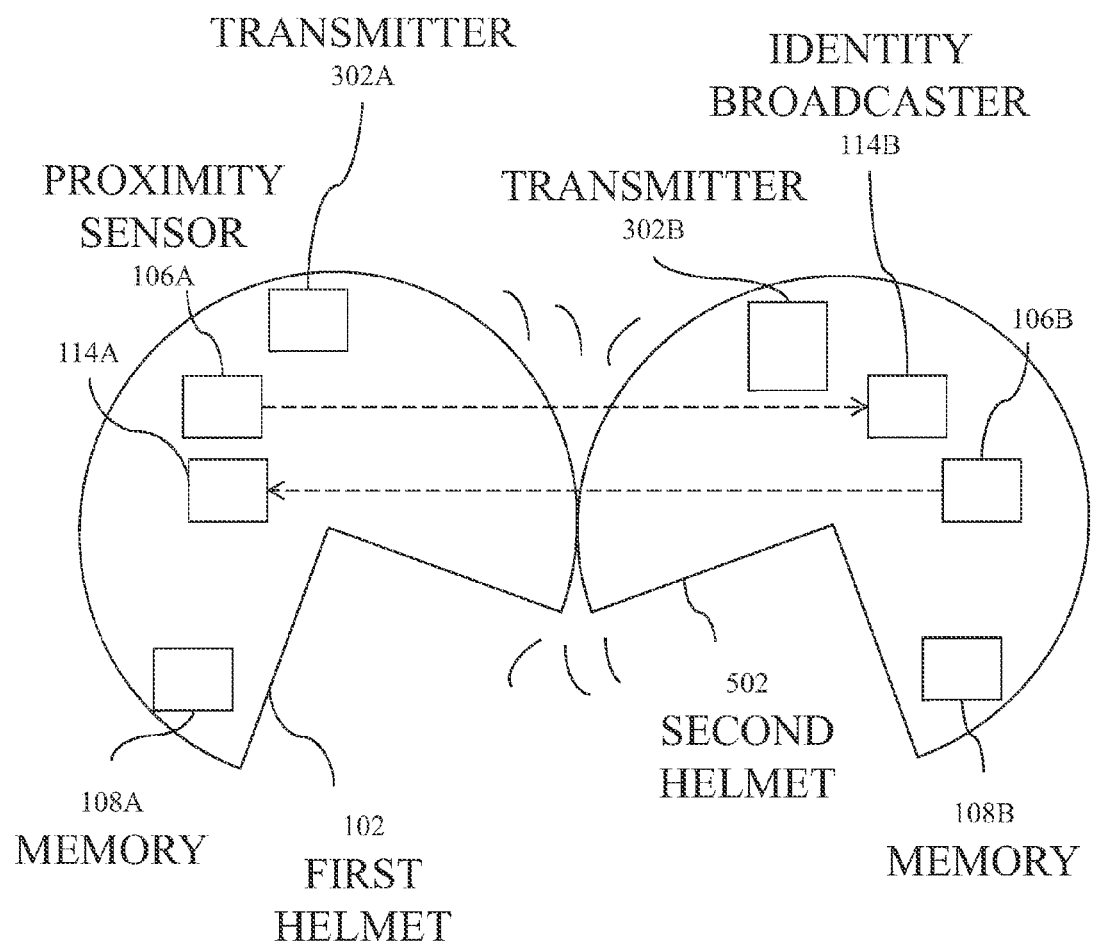
FIG. 17 is a schematic diagram depicting a variation of the systems depicted in FIGS. 1A and 3.

FIG. 17 is a schematic diagram depicting a variation of the systems depicted in FIGS. 1A and 3. In this aspect, the helmet exterior surfaces may be electrically conductive, or at least semi-conductive. In this aspect, the helmet proximity sensors and identity broadcasters do not have wireless communications interfaces, but rather, are connected to helmet conductive exterior surface. When two helmets collide, an electrical connection is momentarily formed between the proximity detector 106a of a first helmet 102 and an identity broadcaster 114b of a second helmet 502, and proximity data is collected. Likewise, the proximity detector 106b of the second helmet is able to collect proximity data in response to contact the identity broadcaster 114b of the second helmet. Note: the proximity sensor and identity broadcaster (e.g., units 106a and 114a) may be embedded in a single device.

Further, in such a system an impact sensor is not required. That is, the proximity sensor performs the function of an impact sensor, since the proximity sensor only collects data when in contact with another helmet. However, each helmet may additionally include an impact sensor (104, see FIGS. 1A and 3), as described above. This impact sensor, or a proximity sensor modified to perform impact sensing functions, may measure impact magnitude, and the proximity and/or impact data may be not be recorded or transmitted unless it exceeds an impact threshold.

As in the systems above, the helmets may include a transmitter 302 to transmit proximity and impact information (if measured). Alternatively, or in addition, the proximity and impact information (if any) may be stored in memory 108.

As in the systems above, additional information may be provided to fine-tune the analysis. The helmets may include an embedded clock (128, see FIGS. 1A and 3) to supply timestamps, permitting the transmission and/or recordation of a timestamp associated with a proximity detection and impact (if separately sensed).

Figure 21:
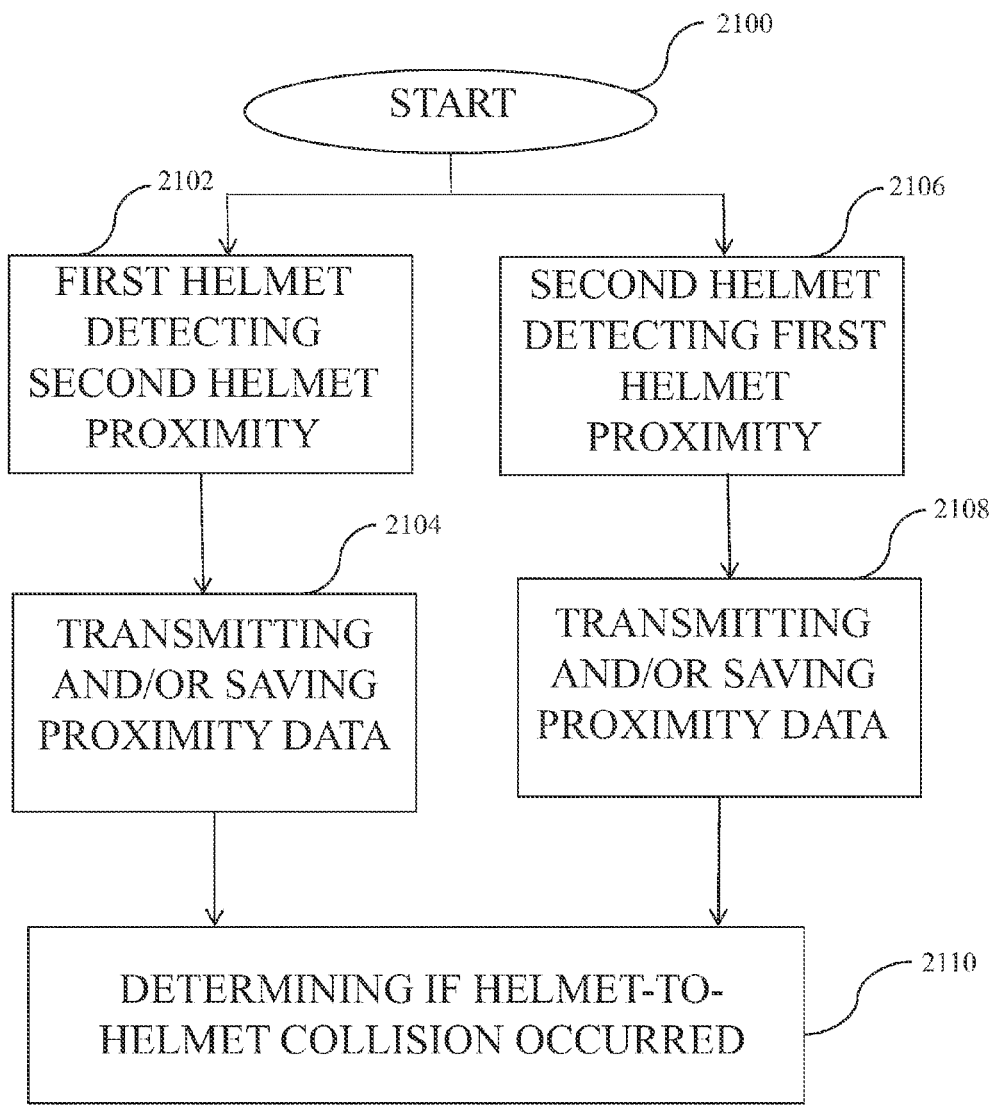
FIG. 21 is a flowchart illustrating the process associated with the system of FIG. 17.

FIG. 21 is a flowchart illustrating the process associated with the system of FIG. 17. The method starts at Step 2100. In Step 2102 a first helmet detects the proximity of a second helmet. In Step 2104 the proximity data is transmitted and/or saved in local memory. In Step 2106 a second helmet detects the proximity of the first helmet. In Step 2108 the proximity data is transmitted and/or saved in local memory. In Step 2110 a monitor uses the proximity data to determine if a helmet-to-helmet collision occurred. As in the methods above, the decision making process may be refined with the use of timestamp, impact, and impact magnitude data.

Figure 18:
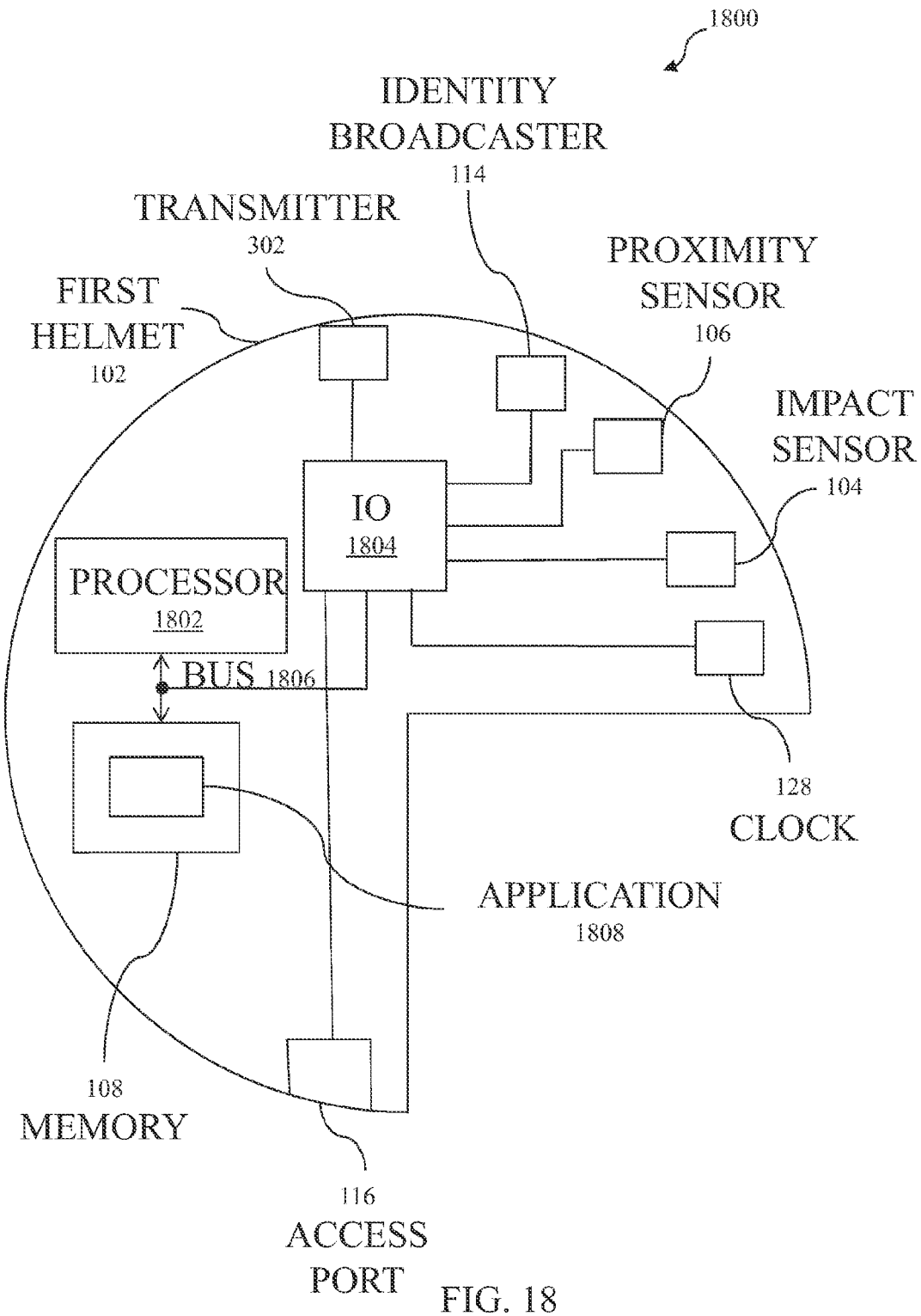
FIG. 18 is a schematic diagram depicting a helmet sensor system enabled using processor executable software instructions.

FIG. 18 is a schematic diagram depicting a helmet sensor system enabled using processor executable software instructions. The helmet logic in the above-described systems may be enabled with state machine, combinational logic, or software. If enabled with software, the first helmet 102 may include a processor 1802 connected to memory 108 and an input/output (IO) interface 1804 via a bus 1806. The IO 1804 may be connected to the following modules: transmitter 302, impact sensor 104, proximity sensor 106, clock 128, identity broadcaster 114, and access port 116. In sensing the proximity of other helmets, a media access control (MAC) ID may be used for identity broadcasting. Note: as described in the systems above, the helmet need not necessarily include all the above-mentioned modules. The logic needed to communicate with and interpret data from the modules is enabled by a sequence of software instructions stored in memory 108 and executed by processor 1802. For simplicity, the software instructions for all the modules in referred to as application 1808.

Figure 19:
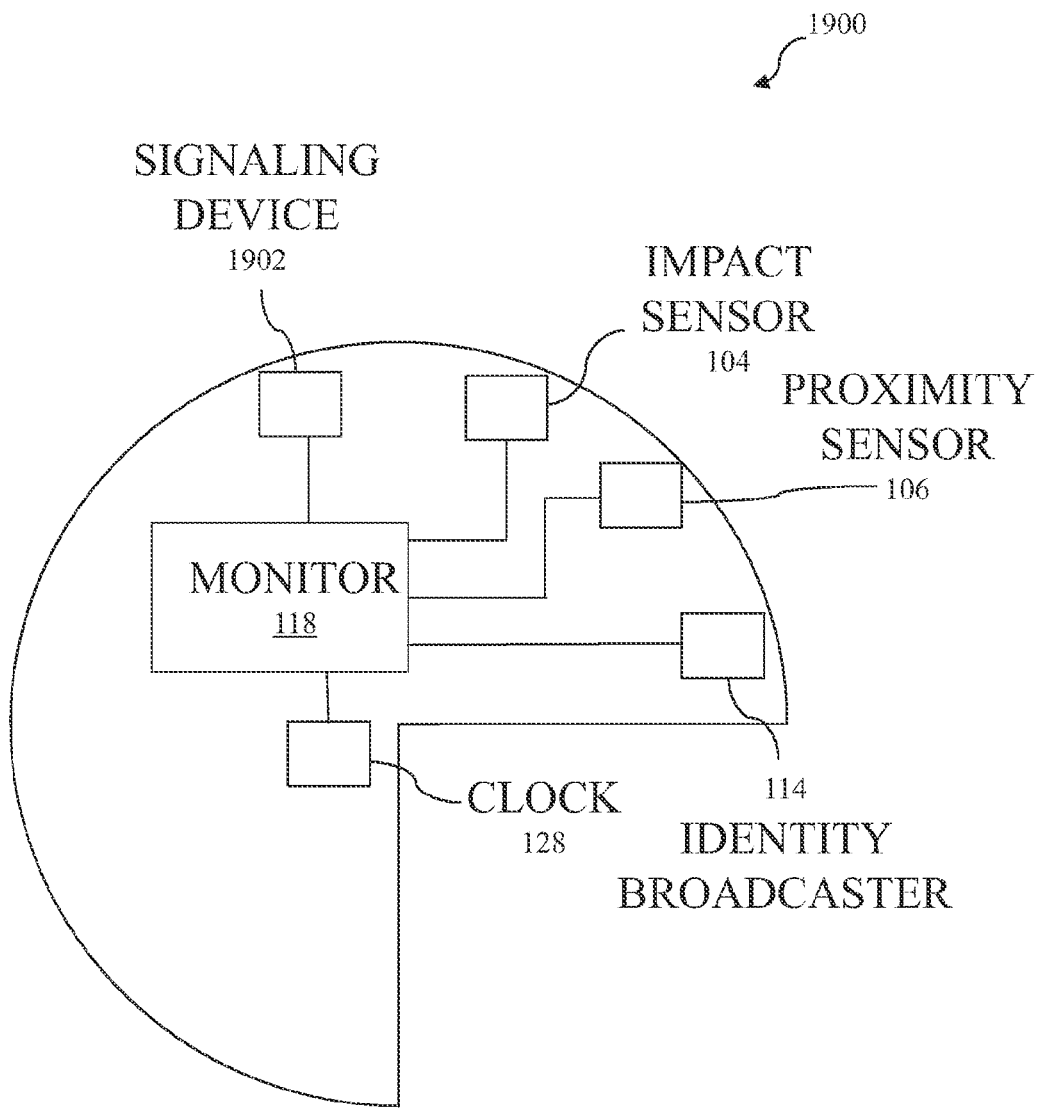
FIG. 19 is a schematic diagram of a system where at least one helmet, and typically all the helmets, includes a monitor.

FIG. 19 is a schematic diagram of a system where at least one helmet, and typically all the helmets, includes a monitor. As in the systems described above, the monitor 118 may collect impact data, proximity data, and timing information and/or interact with the following modules: impact sensor 104, proximity sensor 106, identity broadcaster 114, clock 128, and signaling device 1902. However, instead of transmitting this data to a monitor on the sidelines, an analysis is performed by a monitor within the helmet. The decision making process is similar to the processes described above, being based on factors such as impact, impact magnitude, and the proximity of other helmets. If a helmet-to-helmet or probable concussion is detected, the monitor 118 engages the signaling device 1902. The signaling device 1902 may be a simple auditory or visual alarm. In another aspect, the signaling device 1902 may be a wireless or NFC transmitter, and may include a wired connection port. The monitor may be enabled using state machine logic, combinational logic, or processor-executable software instructions. As in the systems described above, not all the modules pictured in the figure need be employed in system 1900.

System and methods have been provided for the detection of helmet-to-helmet contact and illegal player motion. Examples of particular devices and process steps have been presented to illustrate the invention. However, the invention is not limited to merely these examples. In the systems and methods described above, the proximity sensors and identity broadcasting devices have been described as embedded in the helmet. Alternatively however, these devices may be located on a player in a position other than the helmet. Other variations and embodiments of the invention will occur to those skilled in the art.

We claim:

1. A method for detecting helmet-to-helmet contact, the method comprising:
    a first helmet detecting an impact;
    the first helmet detecting a proximity of a second helmet;
    the first helmet recording impact detection results and proximity detection results;
    a second helmet detecting the impact;
    the second helmet detecting a first helmet proximity signal;
    the second helmet recording impact detection results and proximity detection results;
    a monitor reading the impact detection results and proximity detection results from the first and second helmets; and,
    the monitor determining that a helmet-to-helmet contact has occurred between the first and second helmets in response to analyzing the impact detection results and proximity detection results.

2. The method of claim 1 wherein the first helmet recording the impact detection results includes the first helmet recording the detection of the impact exceeding a first impact threshold.

3. The method of claim 1 wherein the first helmet recording the proximity detection results includes the first helmet recording the detection of a proximity signal exceeding a received first signal strength.

4. The method of claim 1 wherein the first helmet recording the impact detection results includes the first helmet recording a timestamp associated with a time of impact occurrence.

5. The method of claim 1 wherein the first helmet recording the proximity detection results includes the first helmet recording a timestamp associated with a time of proximity detection.

6. The method of claim 1 wherein the first helmet detecting the second helmet proximity signal includes simultaneously detecting a plurality of helmet proximity signals; and,
    wherein the first helmet recording the proximity detection results includes the first helmet recording proximity detection results for information selected from a group consisting of the plurality of helmet proximity signals and one of the plurality of helmet proximity signals having a largest detected proximity signal strength.

7. The method of claim 1 further comprising:
    the first helmet broadcasting an identity signal, to be used for first helmet proximity detection, with a broadcast trigger selected from a group consisting of subsequent to detecting the impact, periodically, and continuously.

8. The method of claim 1 wherein the first helmet detecting the impact includes the first helmet measuring an impact magnitude; and,
    wherein the first helmet recording the impact detection results includes the first helmet recording the impact magnitude measurement.

9. A method for detecting helmet contact, the method comprising:
    a first helmet detecting an impact;
    the first helmet transmitting a signal indicating a detected impact;
    a second helmet detecting the impact;
    the second helmet transmitting a signal indicating a detected impact;
    in response to analyzing the signal transmissions of the first and second helmets, a monitor determining that a helmet-to-helmet contact has occurred between the first and second helmets;
    the first helmet detecting a proximity of the second helmet;
    the second helmet detecting a proximity of the first helmet;
    wherein the first helmet transmitting the signal indicating the detected impact includes the first helmet transmitting a signal indicating the detected impact and the detected second helmet proximity;
    wherein the second helmet transmitting the signal indicating the detected impact includes the second helmet transmitting a signal indicating the detected impact and the detected first helmet proximity;
    wherein monitor determining that the helmet-to-helmet contact has occurred includes the monitor determining that a helmet-to-helmet contact has occurred in response to analyzing the detected impact and detected helmet proximity transmitted by the first and second helmets.

10. The method of claim 9 wherein the first helmet transmitting the signal includes the first helmet transmitting a signal in response to the impact exceeding a first impact threshold.

11. The method of claim 9 wherein the first helmet transmitting the signal includes the first helmet transmitting a timestamp associated with a time of impact occurrence.

12. The method of claim 9 wherein the first helmet detecting the impact includes the first helmet measuring an impact magnitude; and,
    wherein the first helmet transmitting the signal includes the first helmet transmitting a signal including the impact magnitude measurement.

13. The method of claim 9 wherein the first helmet detecting the proximity of the second helmet includes the first helmet detecting a second helmet identity signal; and,
    wherein the first helmet transmitting the signal indicating the detected impact and the detected second, helmet proximity includes the first helmet transmitting the detected second helmet proximity in response to the second helmet identity signal exceeding a first signal strength.

14. A system for detecting helmet-to-helmet contact, the system comprising:
    a first helmet;
    an impact sensor embedded in the first helmet to detect a helmet impact;

a proximity sensor embedded in the first helmet to detect a proximity of another helmet;

a transmitter embedded in the first helmet, and connected to the proximity sensor to transmit proximity detection results in response to the impact sensor detecting the helmet impact;

a monitor comprising:

a receiver for accepting impact and proximity detection results transmitted by the plurality of helmets;

an analysis module to determine that a helmet-to-helmet contact has occurred in response to analyzing the impact and proximity detection results from the plurality of helmets; and, an interface to supply analysis results.

15. The system of claim 14 wherein the transmitter transmits the proximity detection results in response to the impact exceeding a first impact threshold.

16. The system of claim 14 wherein the proximity sensor detects a second helmet identity signal; and, wherein the transmitter transmits the proximity detection results in response to the second helmet identity signal exceeding a first signal strength.

17. The system of claim 14 further comprising:

a helmet identity broadcaster embedded, in the first helmet, with a broadcast trigger selected from a group consisting of continuously, periodically, and in response to the impact sensor detecting the impact.

\* \* \* \* \*